(12) United States Patent
Gschwind

(10) Patent No.: US 9,582,279 B2
(45) Date of Patent: Feb. 28, 2017

(54) EXECUTION OF CONDITION-BASED INSTRUCTIONS

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 677 days.

(21) Appl. No.: 13/832,542

(22) Filed: Mar. 15, 2013

(65) Prior Publication Data

US 2014/0281430 A1  Sep. 18, 2014

(51) Int. Cl.
*G06F 9/30* (2006.01)

(52) U.S. Cl.
CPC ...... *G06F 9/30189* (2013.01); *G06F 9/30007* (2013.01); *G06F 9/30043* (2013.01); *G06F 9/30072* (2013.01); *G06F 9/30145* (2013.01)

(58) Field of Classification Search
CPC .... G06F 9/30; G06F 9/30043; G06F 9/30072; G06F 9/30145
USPC ......................................................... 712/226
See application file for complete search history.

(56) References Cited

U.S. PATENT DOCUMENTS

| | | | |
|---|---|---|---|
| 5,551,013 A | 8/1996 | Beausoleil et al. | |
| 5,574,873 A | 11/1996 | Davidian | |
| 5,790,825 A | 8/1998 | Traut | |
| 6,009,261 A | 12/1999 | Scalzi et al. | |
| 6,308,255 B1 | 10/2001 | Gorishek, IV et al. | |
| 6,353,883 B1* | 3/2002 | Grochowski ....... | G06F 9/30072 712/226 |
| 6,463,582 B1 | 10/2002 | Lethin et al. | |
| 6,513,109 B1 | 1/2003 | Gschwind et al. | |
| 6,918,032 B1 | 7/2005 | Abdallah et al. | |
| 6,918,033 B1 | 7/2005 | Cho | |
| 7,254,693 B2 | 8/2007 | Eisen et al. | |
| 7,707,396 B2 | 4/2010 | Bradford et al. | |
| 7,730,263 B2 | 6/2010 | Burtscher et al. | |
| 7,788,473 B1* | 8/2010 | Nelson ............... | G06F 9/383 712/219 |
| 7,793,079 B2 | 9/2010 | Badran-Louca et al. | |
| 7,849,293 B2 | 12/2010 | Blaner et al. | |
| 7,941,654 B2 | 5/2011 | Luick | |

(Continued)

OTHER PUBLICATIONS

Jon stokes, "Inside the Machine", 2007, No Starch Press, p. 196.*

(Continued)

*Primary Examiner* — Aimee Li
*Assistant Examiner* — Courtney Carmichael-Moody
(74) *Attorney, Agent, or Firm* — William A. Kinnaman, Jr., Esq.; Blanche E. Schiller, Esq.; Heslin Rothernberg Farley & Mesiti P.C.

(57) ABSTRACT

Execution of condition-based instructions is facilitated. A condition-based instruction is obtained, as well as a confidence level associated with the instruction. The confidence level is checked, and based on the confidence level being a first value, a predicted operation of the instruction, which is based on a predictor, is unconditionally performed. Further, based on the confidence level being a second value, a specified operation of the instruction, which is based on a determined condition, is conditionally performed.

20 Claims, 24 Drawing Sheets

(56) References Cited

U.S. PATENT DOCUMENTS

| | | | |
|---|---|---|---|
| 2002/0016907 A1 | 2/2002 | Grochowski et al. | |
| 2005/0188185 A1* | 8/2005 | Grochowski | G06F 9/3017 |
| | | | 712/226 |
| 2007/0288732 A1 | 12/2007 | Luick | |
| 2008/0177984 A1* | 7/2008 | Lataille | G06F 9/30043 |
| | | | 712/220 |
| 2008/0276069 A1* | 11/2008 | Blaner | G06F 9/30043 |
| | | | 712/205 |
| 2011/0314263 A1* | 12/2011 | Greiner | G06F 9/3001 |
| | | | 712/221 |
| 2014/0013089 A1* | 1/2014 | Henry | G06F 9/30076 |
| | | | 712/226 |

OTHER PUBLICATIONS

Po-Yung Chang, "Classification-Directed Branch Predictor Design," Disertation, The University of Michigan, 1997, pp. 1-123.

Hyesoon Kim et al., "Wish Branches: Combining Conditional Branching and Predication for Adaptive Predicated Execution," 38th Annual IEEE/ACM Int'l. Symp, on Microarchitecure, 2005, pp. 1-12.

Grunwald et al., "Confidence Estimation for Speculation Control," IEEE, 1998, pp. 122-131.

z/Architecture Principles of Operation, IBM® Publication No. SA22-7832-09, Tenth Edition, Sep. 2012, pp. 1-1568.

Power ISA™ Version 2.06 Revision B, International Business Machines Corporation, Jul. 23, 2010, pp. 1-1341.

Intel® 64 and IA-32 Architectures Developer's Manual: vol. 2B, Instructions Set Reference, A-L, Order No. 253666-045US, Jan. 2013, pp. 1-524.

Intel® 64 and IA-32 Architectures Developer's Manual: vol. 2B, Instructions Set Reference, M-Z, Order No. 253667-045US, Jan. 2013, pp. 1-550.

Gschwind et al., Office Action for U.S. Appl. No. 14/550,981, filed Nov. 22, 2014, (U.S. Patent Publication No. 2015/0106600 A1), dated Sep. 30, 2015 (16 pages).

Final Office Action for U.S. Appl. No. 14/550,981 dated Feb. 18, 2016, pp. 1-25.

* cited by examiner

EXECUTION OF CONDITION-BASED INSTRUCTIONS

BACKGROUND

One or more aspects relate, in general, to processing within a computing environment, and in particular, to execution of condition-based instructions within such an environment.

Many types of instructions are used in a computing environment in order to perform certain tasks and to control the environment. One type of instruction is a condition-based instruction, in which performance of the instruction depends on a particular condition. This condition may be set by yet another instruction. For instance, with a Load on Condition instruction, provided in the z/Architecture offered by International Business Machines Corporation, a load is performed based on a condition code having one value (which is set by another instruction), and no load is performed based on the condition code having another value.

Further, in other condition-based instructions, one datum is selected based on one value of a condition, and another datum is selected based on another value of the condition.

BRIEF SUMMARY

Shortcomings of the prior art are overcome and advantages are provided through the provision of a computer program product for facilitating execution of an instruction in a computing environment. The computer program product includes, for instance, a computer readable storage medium readable by a processing circuit and storing instructions for execution by the processing circuit for performing a method. The method includes, for instance, checking a confidence level associated with the instruction; based on the confidence level being a first value, unconditionally performing a predicted operation of the instruction, the predicted operation based on a predictor associated with the instruction; and based on the confidence level being a second value, conditionally performing a specified operation of the instruction, the specified operation based on a determined condition.

Methods and systems relating to one or more aspects are also described and claimed herein. Further, services relating to one or more aspects are also described and may be claimed herein.

Additional features and advantages are realized through the techniques of one or more aspects. Other embodiments and aspects are described in detail herein and are considered a part of the claims.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

In accordance with one or more aspects, a capability is provided to facilitate execution of machine instructions in a computing environment. In particular, a capability is provided to facilitate execution of condition-based instructions, in which execution may proceed without waiting for a determination of the condition (e.g., an indication of the particular operation) to be performed. To facilitate execution, in one example, a confidence level associated with the instruction is checked. The confidence level is part of a predictor or it is itself a predictor. Based on the confidence level, either execution proceeds as is conventional for that instruction or execution proceeds based on a prediction of the condition.

Examples of condition-based instructions are load conditional instructions, such as the Load On Condition (a.k.a., Move On Condition) instructions, offered by International Business Machines Corporation. Other examples of condition-based instructions are data selection instructions that select one datum or another based on a select condition, such as the Integer Select instruction of the Power Architecture offered by International Business Machines Corporation. As used herein, datum refers to a data value and/or an operand, as examples.

Figure 1A:
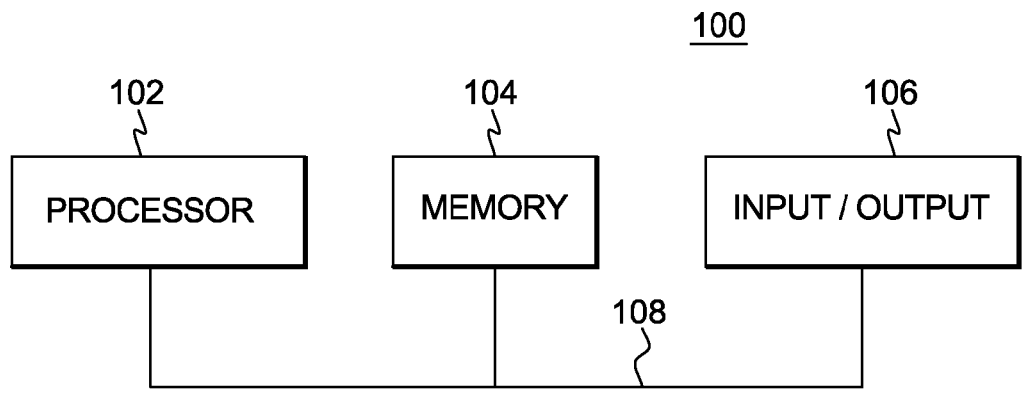
FIG. 1A depicts one example of a computing environment to incorporate and use one or more aspects.

One embodiment of a computing environment to incorporate and use one or more aspects is described with reference to FIG. 1A. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-09, Tenth Edition, September, 2012, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation, Armonk, N.Y., USA. Other names used herein may be registered trademarks, trademarks, or product names of International Business Machines Corporation or other companies.

In a further embodiment, processor 102 is based on the Power Architecture offered by International Business Machines Corporation. One embodiment of the Power Architecture is described in "Power ISA™ Version 2.06 Revision B," International Business Machines Corporation, Jul. 23, 2010, which is hereby incorporated herein by reference in its entirety. POWER ARCHITECTURE® is a registered trademark of International Business Machines Corporation.

In yet a further embodiment, processor 102 is based on an Intel architecture offered by Intel Corporation. One embodiment of the Intel architecture is described in "Intel® 64 and IA-32 Architectures Developer's Manual: Vol. 2B, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013, each of which is hereby incorporated herein by reference in its entirety. Intel® is a registered trademark of Intel Corporation, Santa Clara, Calif.

Figure 1B:
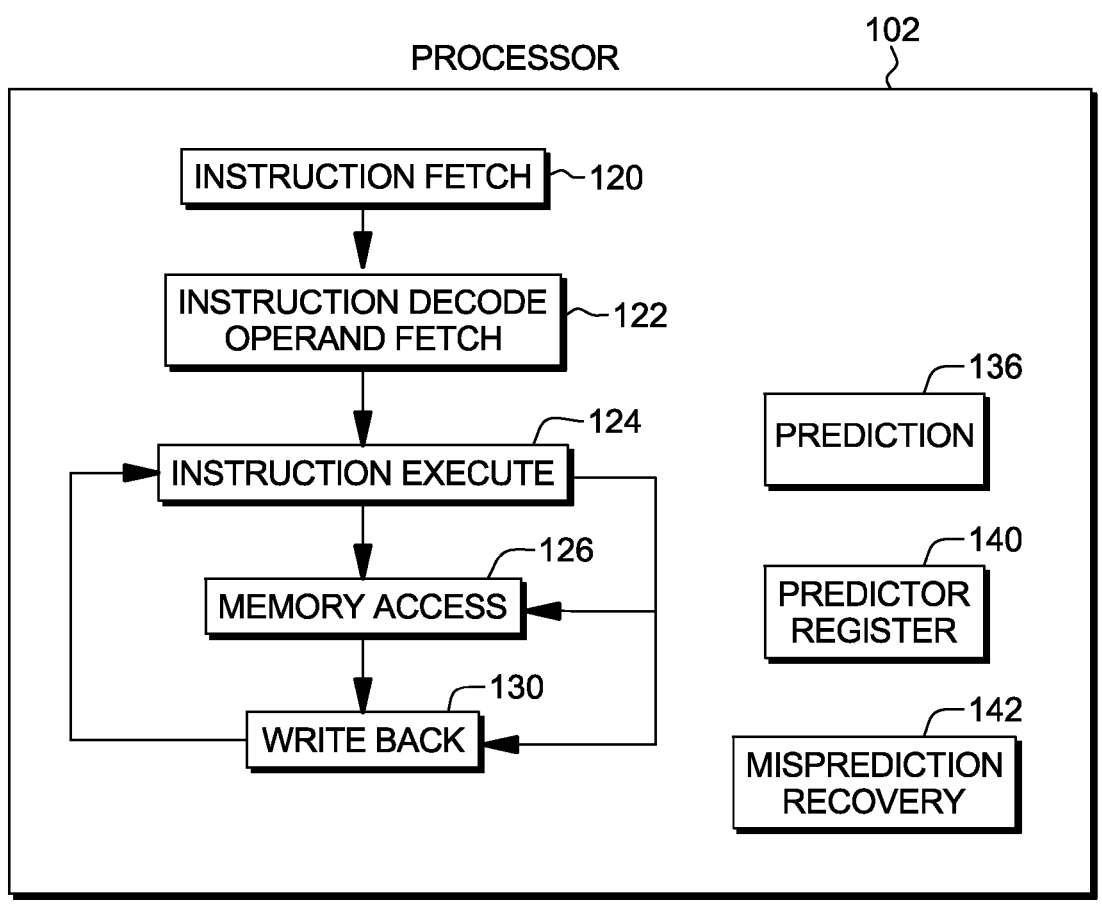
FIG. 1B depicts further details of the processor of FIG. 1A.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with an aspect, provide predictive functionality by including at least a portion of or having access to a prediction component 136. This functionality is described in further detail below.

Processor 102 also includes one or more registers, such as a register 140 to hold a predictor data structure (e.g., table) that includes one or more predictors. The predictor data structure is used by the processor, and in particular, the prediction component, as described further below.

In a further embodiment, the predictor data structure is stored in memory and accessed by processor 102. Yet further, a portion of the predictor data structure may be maintained in one or more CPU registers, and a further portion is stored in memory or one or more external storage devices. Other embodiments are also possible.

Another register used by processor 102, in accordance with one or more aspects, is a register 142 to include a mispredicted recovery indicator. In a further example, this indicator is stored in memory and accessed by the processor. Other examples are also possible.

Figure 2A:
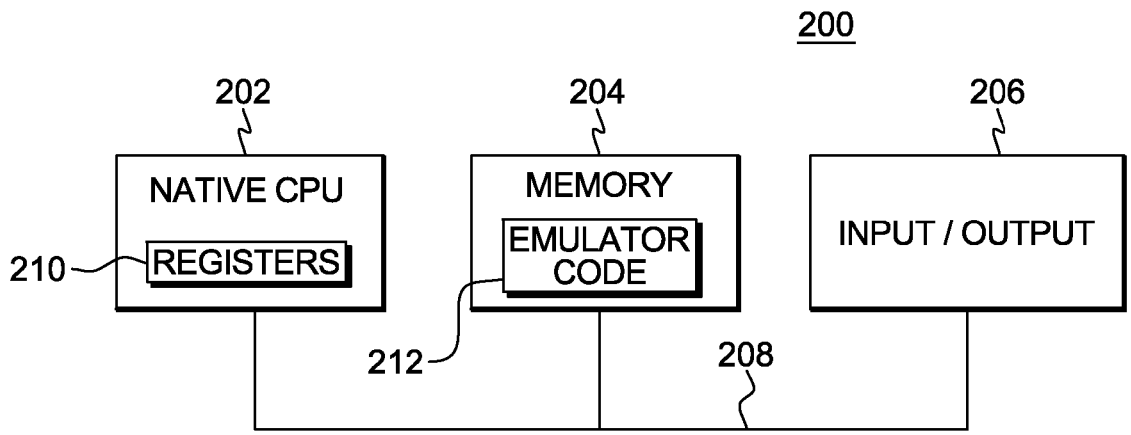
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a pSeries server or an xSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the z/Architecture, such as PowerPC processors, pSeries servers, xSeries servers, HP Superdome servers or others, to emulate the z/Architecture and to execute software and instructions developed based on the z/Architecture.

Figure 2B:
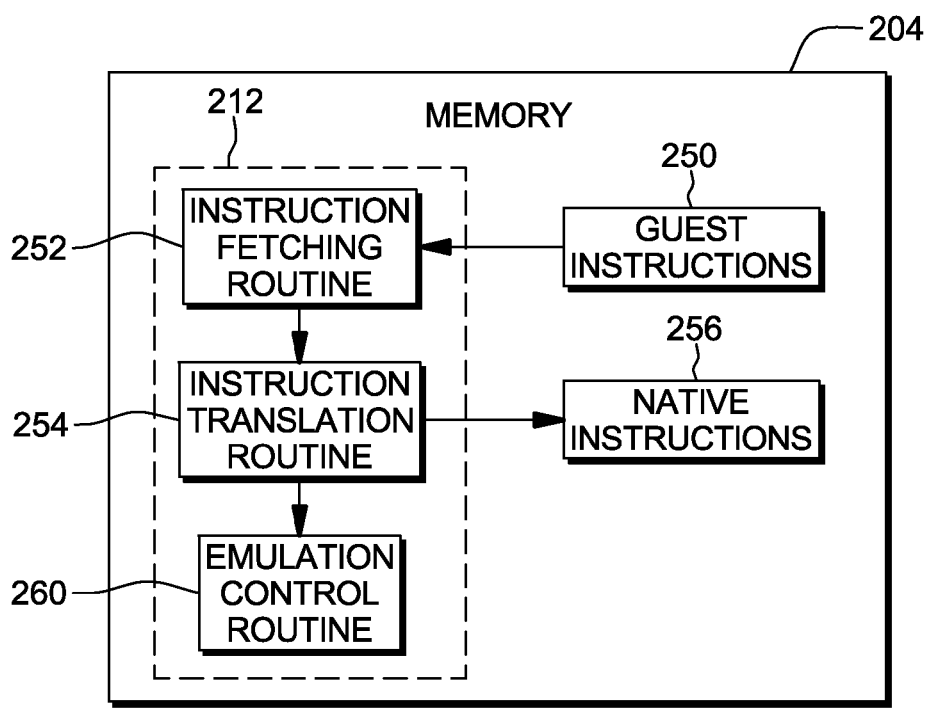
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is an instruction described herein. The instruction, which is of one architecture (e.g., the z/Architecture) is fetched from memory, translated and represented as a sequence of native instructions 256 of another architecture (e.g., PowerPC, pSeries, xSeries, Intel, etc.). These native instructions are then executed.

In accordance with one aspect, processing of certain types of instructions, such as condition-based instructions, is facilitated by use of a predictor that enables selection of one execution path over another execution path. The predictor depends on the instruction, and has, for instance, a confidence level and a prediction. The confidence level includes an indication of strong (or high) or weak (or low); and the prediction is one of a plurality of operations, depending on the instruction. For instance, for a load conditional instruction, the prediction is either to perform a load operation (load) or suppress a load operation (no load); and for a data selection instruction, the prediction is either a selection of a first datum (select A) or a selection of a second datum (select B), as examples. In a further example, there are multiple predictors: one to provide the confidence and one to provide the predicted operation. Other examples are also possible.

One embodiment of the logic to execute an instruction based on a predictor associated with the instruction is described with reference to FIG. 3. In one example, this logic is performed by a processor.

Figure 3:
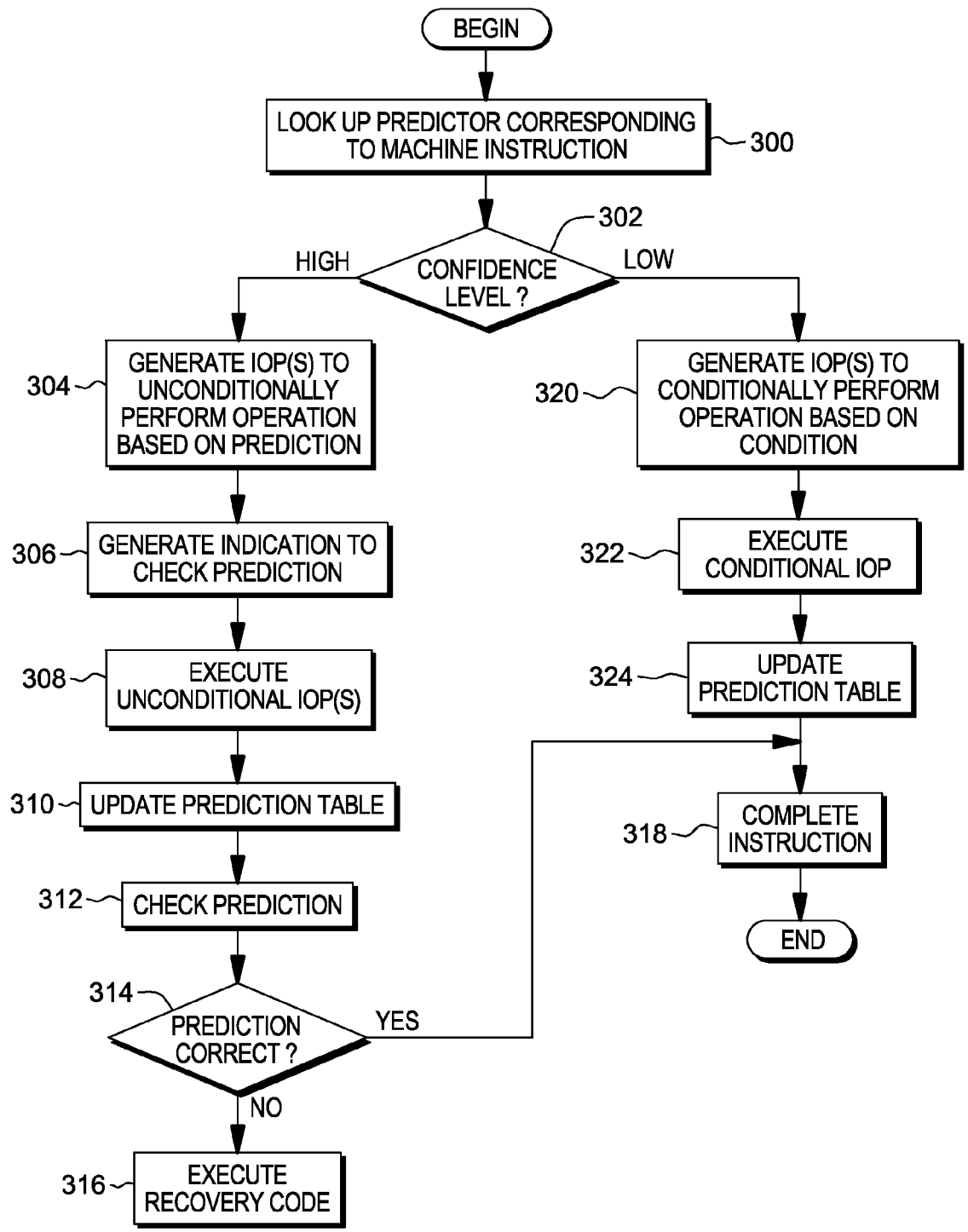
FIG. 3 depicts one embodiment of the logic to execute an instruction based on a confidence level of a predictor.

Referring to FIG. 3, initially, based on receiving an instruction to be executed, a predictor corresponding to that instruction is checked, STEP 300. In particular, in one embodiment, for each instruction that is to be executed based on prediction, there is a predictor associated therewith. The predictor is, for instance, a saturating counter or bimodal predictor, which is a state machine with four states encoded, as follows: 11 (binary) Strongly Predicted A (e.g., load, select datum A); 01 Weakly Predicted A (e.g., load, select datum A); 00 Weakly Predicted B (e.g., no load, select datum B); and 10 Strongly Predicted B (e.g., no load, select datum B). The leftmost bit indicates the confidence; i.e., strong or weak; and the rightmost bit indicates the decision or operation; e.g., no load, load, select A, select B. Again, in a further example, there are two predictors: one for the confidence level, and one for the predicted operation. The current predictor for an instruction is maintained in a table or other data structure, which is indexed by the instruction address bits, and stored, for instance, in a register (e.g., register 140), memory, etc.

Based on obtaining the instruction, the predictor is obtained for that instruction, and the confidence level of the predictor is checked to determine the confidence of correctly predicting the condition (e.g., the operation to be performed). If the confidence level is high, INQUIRY 302, then a predicted operation, which is indicated by the predictor, is unconditionally performed. For instance, if the predictor has a value of 11, and the instruction is the load instruction, then the load is unconditionally performed. Similarly, if the predictor has a value of 11, and the instruction is a data selection instruction, then datum A is selected. This unconditional processing is further described below.

Continuing with INQUIRY 302, should it be determined that the confidence level for the predictor is high, then, in one embodiment, an execution implementation is generated to unconditionally perform the condition based on the prediction, STEP 304. In one embodiment, the unconditionally performing occurs speculatively. The implementation includes, for instance, generating one or more internal operations (IOPs), but in other embodiments, it includes using microcode or a state machine, etc. Thus, in one example of the load instruction, internal operations are generated to perform the load.

In addition to the above, an indication is generated to check the prediction, STEP 306. This indication is to check whether the prediction was accurate, and again, as examples, it is implemented via internal operations, a state machine, microcode, or other types of implementations.

For instance, as a particular example, assume a load conditional instruction, LC Rn=Rx, is to be unconditionally executed. To accomplish this, the decode process generates a sequence of one or more internal instructions unconditionally corresponding to the action that is predicted, as well as a check operation. Thus, for LC Rn=Rx, in one embodiment, a load register internal instruction (LR IOP), such as LR Rn=Rx, is generated and executed, as well as a check internal instruction (e.g., check IOP).

Thereafter, the operation (e.g., LR IOP) is unconditionally performed, STEP 308. This includes, in one example, executing the unconditional internal operations previously generated. Thus, in one example, the load is unconditionally performed, since the predictor had a value of 11, in this particular example. Additionally, the prediction data structure is updated, based on the prediction, STEP 310.

Subsequently, the prediction is checked (e.g., check IOP), STEP 312. In particular, for a Load on Condition instruction, when the input condition code actually becomes available which indicates what operation is to be performed (e.g., load, no load), a determination is made as to whether the prediction was correct. If the prediction was not correct, INQUIRY 314, then recovery code is executed, STEP 316. However, if the prediction was correct, then execution of the instruction is completed, STEP 318.

Returning to INQUIRY 302, if the confidence level is low, then an implementation is provided to conditionally perform the operation based on a determination of the actual condition, STEP 320. This implementation includes, in one example, generating internal operations; however, in further examples, it includes implementing the operation in microcode or with state machines, as examples. Thus, in this executional path, the instruction waits for an indication of the actual operation to be performed (e.g., a condition code to be set or a register to be updated to indicate the operation). For instance, for a Load on Condition instruction that performs the operation based on a condition code, the instruction actually waits for the condition code, which is set by another instruction.

Subsequently, the conditional internal operations that were generated are executed, STEP 322, and the prediction data structure is updated based on the execution, STEP 324. Processing then continues to STEP 318, in which the instruction is completed.

As indicated above, one example of an instruction to use the logic of FIG. 3 is a Load On Condition instruction, which is also referred to as a Move On Condition instruction. Examples of Load On Condition instructions are depicted in FIGS. 4A and 4B, and described below.

Figure 4A:
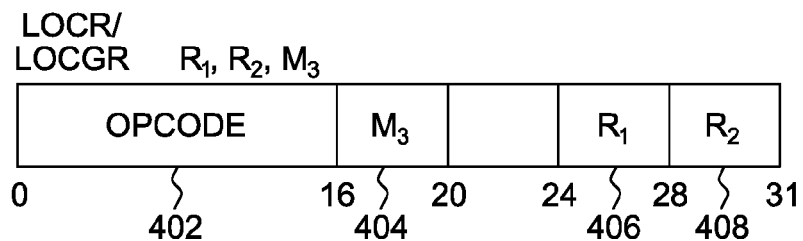
FIG. 4A depicts one embodiment of a Load On Condition instruction.
Figure 4B:
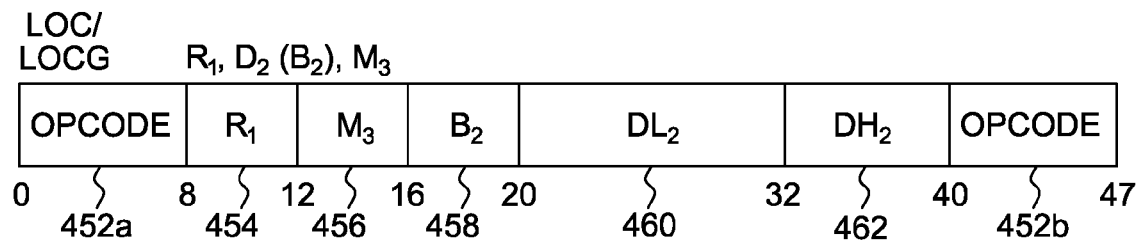
FIG. 4B depicts another embodiment of a Load On Condition instruction.

Referring to FIG. 4A, a Load On Condition instruction 400 is described. In this example, the format of the instruction is a register-and-register format (e.g., LOCR-operands are 32 bits; LOCGR-operands are 64 bits), and it includes: an opcode field 402 (e.g., bits 0-15) to include an opcode to indicate a load on condition operation; a mask field ($M_3$) 404 (e.g., bits 16-19) to provide a mask of condition codes; a first register field 406 (e.g., bits 24-27) used to designate a first register ($R_1$); and a second register field 408 (e.g., bits 28-31) used to designate a second register ($R_2$). Each of the fields 404-408, in one example, is separate and independent from the opcode field. Further, in one embodiment, they are separate and independent from one another; however, in other embodiments, more than one field may be combined.

In one example, selected bits (e.g., the first two bits) of the opcode designated by opcode field 402 specify the length of the instruction. In this particular example, the selected bits indicate that the length is two halfwords. Further, with this instruction format, the contents of the register designated by the $R_1$ field are called the first operand, and the contents of the register designated by the $R_2$ field are called the second operand.

A further embodiment of a Load On Condition instruction 450 is described with reference to FIG. 4B. In this example, the format of the instruction is a register-and-storage format (e.g., LOC-operands are 32 bits; LOCG-operands are 64 bits), and it includes: opcode fields 452a (e.g., bits 0-7), 452b (e.g., bits 40-47) to include an opcode to indicate a load on condition operation; a first register field 454 (e.g., bits 8-11) used to designate a first register ($R_1$); a mask field 456 (e.g., bits 12-15) used to designate a mask ($M_3$); and a base field ($B_2$) 458 (e.g., bits 16-19), a first displacement field ($DL_2$) 460 (e.g., bits 20-31), and a second displacement field ($DH_2$) 462 (e.g., bits 32-39) used to form the second operand address. In particular, the contents of the general register designated by the $B_2$ field are added to the contents of the $DH_2$ and $DL_2$ fields to form the second operand address. In one example, the displacement ($DH_2$ and $DL_2$) for LOC and LOCG is treated as a 20-bit signed binary integer.

In one example, selected bits (e.g., the first two bits) of the opcode designated by opcode field 452a specify the length of the instruction. In this particular example, the selected bits indicate that the length is three halfwords. Further, with this instruction format, the contents of the register designated by the $R_1$ field are called the first operand.

In execution of one embodiment of the Load On Condition instruction, regardless of format, the second operand is placed unchanged at the first operand location if the condition code is one of the values specified by the $M_3$ field and that value is set to one. Otherwise, the first operand remains unchanged.

For example, the $M_3$ field is used as a four bit mask. The four condition codes (0, 1, 2 and 3) correspond, left to right, with the four bits of the mask, as follows:

| Condition Code | Mask Position Value |
|---|---|
| 0 | 8 |
| 1 | 4 |
| 2 | 2 |
| 3 | 1 |

The current condition code is used to select the corresponding mask bit. If the mask bit selected by the condition code is 1, the load is performed. If the mask bit selected is 0, the load is not performed.

For LOC and LOCG, when the condition specified by the $M_3$ field is not met (that is, the load operation is not performed), it is model dependent whether an access exception or a PER (Program Event Recording)-zero address detection event is recognized for the second operand.

Figure 4C:
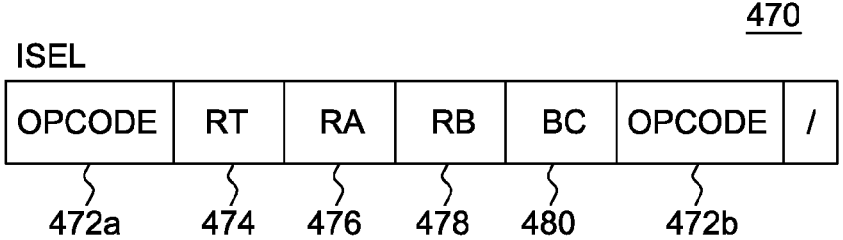
FIG. 4C depicts one example of an Integer Select instruction.

One example of another instruction to use the prediction capability of FIG. 3 is an Integer Select (isel) instruction based on the Power Architecture, offered by International Business Machines Corporation. As shown in FIG. 4C, an Integer Select instruction 470 includes, for instance: opcode fields 472a, 472b to indicate an opcode to specify the integer select operation; a first register field (RT) 474 to designate a first register; a second register field (RA) 476 to designate a second register; a third register field (RB) 478 to designate a third register; and a datum field (BC) 480 to include a value to be used by the instruction.

In execution of one embodiment of this instruction, if the contents of bit BC+32 of a condition register (CR) are equal to one, then the contents of register RA (or 0) are placed into register RT. Otherwise, the contents of register RB are placed into register RT.

Further details relating to using a predictor with the Load On Condition instructions and the data selection instructions are described below. Initially, Load on Condition is described, and then, data selection. In one example, the logic is performed by a processor.

Figure 5:
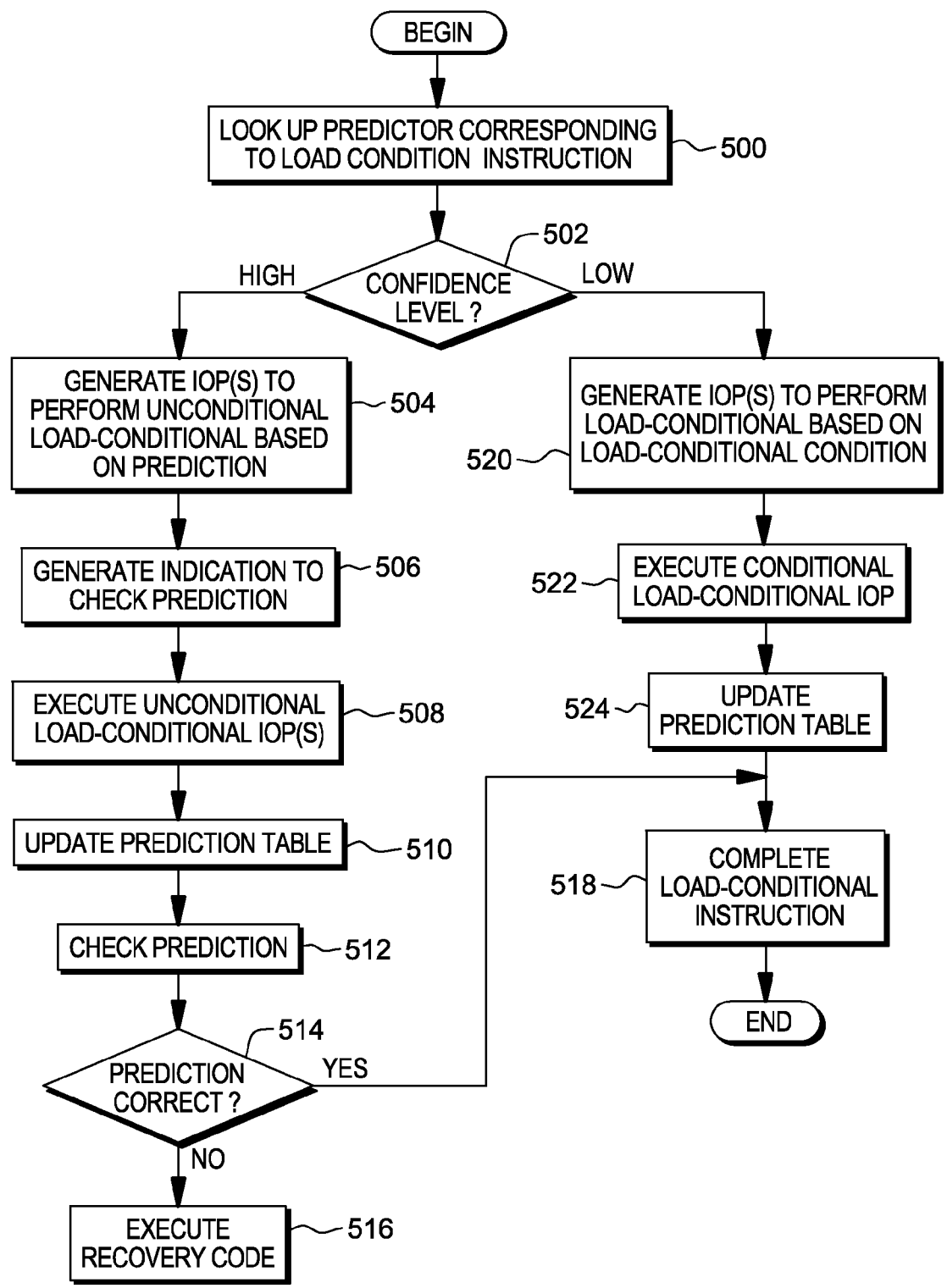
FIG. 5 depicts one embodiment of the logic to execute a Load On Condition instruction based on a confidence level of a predictor.

One embodiment of the logic to use prediction with a Load On Condition instruction is described with reference to FIG. 5. Initially, based on receiving the Load On Condition instruction to be executed, the predictor corresponding to the Load On Condition instruction is checked, STEP 500. If the confidence level is high, INQUIRY 502, then a predicted load conditional, which is indicated by the predictor, is unconditionally performed, STEP 504. For instance, if the predictor has a value of 10 and the instruction is the Load On Condition instruction, then suppression of the load is unconditionally performed. That is, the first operand remains unchanged. As a further example, if the predictor has a value of 11 and the instruction is the Load on Condition instruction, then the load is unconditionally performed.

Continuing with INQUIRY 502, should it be determined that the confidence level for the predictor is high, then, in one embodiment, an execution implementation is generated to unconditionally perform the condition based on the prediction, STEP 504. In one example, the execution implementation includes generating one or more internal operations (IOPs), but in other embodiments, it includes using microcode or a state machine, etc. Thus, in one example of the load instruction, internal operations are generated to suppress the load or perform the load, depending on the predictor.

In addition to the above, an indication is generated to check the prediction, STEP 506. This indication is to check whether the prediction was accurate, and again, as examples, it is implemented via internal operations, a state machine, microcode, or other types of implementations.

Thereafter, the operation is unconditionally performed, STEP 508. This includes, in one example, executing the unconditional internal operations previously generated. Thus, in one example, suppression of the load is unconditionally performed, since the predictor had a value of 10, in this particular example. Additionally, the prediction data structure is updated, STEP 510.

Subsequently, the prediction is checked, STEP 512. In particular, for a Load on Condition instruction, when the condition code actually becomes available, which indicates what operation is to be performed (e.g., load, no load), a determination is made as to whether the prediction was correct. If the prediction was not correct, INQUIRY 514, then recovery code is executed, STEP 516. However, if the prediction was correct, then execution of the instruction is completed, STEP 518.

Returning to INQUIRY 502, if the confidence level is low, then an implementation is provided to conditionally perform the operation based on a determination of the actual condition, STEP 520. Thus, in this executional path, the instruction waits for an indication of the actual operation to be performed. For instance, for a Load on Condition instruction, the instruction actually waits for the condition code, which is set by another instruction and provided as an input to the Load on Condition instruction. To perform the conditional execution, an execution implementation is generated, which in one example, includes generating internal operations; however, in further examples, it includes implementing the operation in microcode or with state machines, as examples.

Subsequently, the conditional internal operations that were generated are executed, STEP 522, and the prediction data structure is updated based on the execution, STEP 524. Processing then continues to STEP 518, in which the instruction is completed.

Although the above logic is described with reference to a Load On Condition instruction, it is also applicable to other condition-based instructions, such as data selection instructions. In one instance, for a data selection instruction, the "load-conditional" of FIG. 5 is replaced with "select".

One embodiment of the recovery performed should the prediction for a condition-based instruction (e.g., a Load On Condition or a data selection instruction) be incorrect is described with reference to FIG. 6. In one example, this logic is performed by a processor, and in particular, fetch and decode components of a processor.

Figure 6:
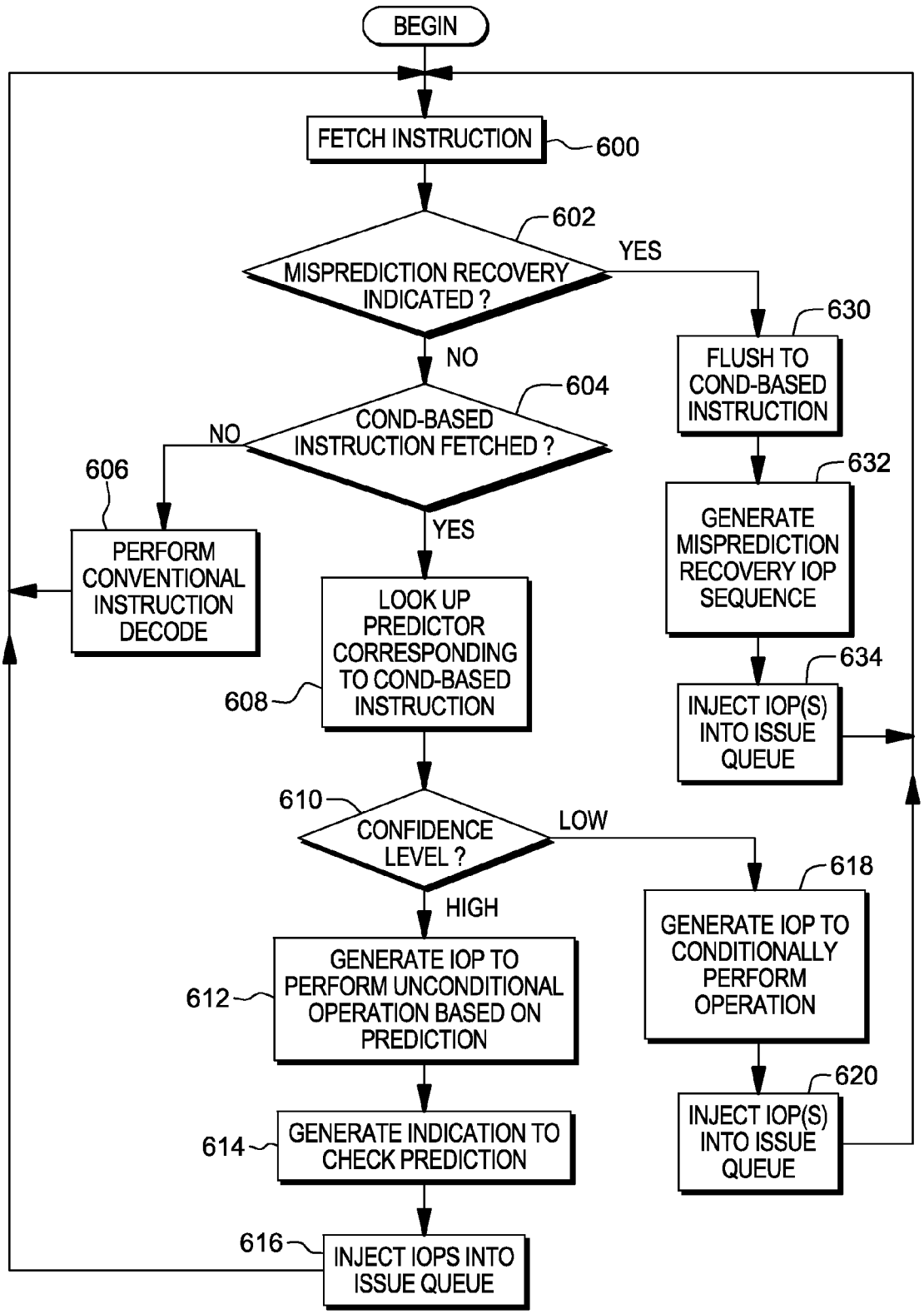
FIG. 6 depicts one embodiment of the logic associated with recovering a condition-based instruction.

Referring to FIG. 6, initially, an instruction is fetched, STEP 600, and a determination is made as to whether misprediction recovery is indicated, INQUIRY 602. This may be indicated in a register (e.g., register 142), memory or by any other mechanism. If recovery is not indicated, then a further determination is made as to whether the instruction that was fetched is a condition-based instruction, INQUIRY 604. If it is not a condition-based instruction, then conventional decoding of the instruction is performed, STEP 606, and processing continues with STEP 600. However, if it is a condition-based instruction, then a look-up is performed in the predictor table to find the current predictor for this instruction, STEP 608. The confidence level of the predictor is checked. If it is a high confidence, INQUIRY 610, then, in one example, an implementation (e.g., internal operations) is generated to unconditionally perform the predicted operation, STEP 612. Further, an implementation (e.g., internal operations) to check the prediction is also generated, STEP 614.

Subsequently, the generated internal operations are placed on an issue queue in order to be executed, STEP 616, and processing continues to STEP 600.

Returning to INQUIRY 610, if the confidence level is low, an implementation (e.g., internal operations) is generated to conditionally perform the operation, which is based on a determined condition, STEP 618. The implementation is placed on the issue queue, STEP 620, and processing continues to STEP 600.

Returning to INQUIRY 602, if a misprediction recovery is indicated, then flushing of the instruction pipeline is performed back to, for instance, the condition-based instruction, STEP 630. That is, in an instruction pipeline, there may be multiple instructions being processed concurrently, each at a different stage of processing (e.g., instruction fetch (IF), instruction issue or decode, register file access (RF) used to access values of registers to be used in execution, execute (EX), or result write back (WB) used to provide results of the execution). Thus, after one instruction ends one stage, such as the instruction fetch stage, and begins another stage, such as the decode stage, another instruction can begin the instruction fetch stage, etc. If there is a misprediction recovery, the pipeline is flushed back to the condition-based instruction. That is, the instructions in the pipeline that started after the condition-based instruction are backed-out in order to restart a correct execution of the condition-based instruction.

Additionally, a condition-based misprediction recovery sequence is generated, STEP 632. For instance, internal operations are generated to perform recovery. This includes, for instance, re-fetching the instruction and performing the opposite operation. For example, if a Load On Condition instruction was executed and the operation performed was a load, then the Load On Condition instruction is re-executed and the load is suppressed. As a further example, if a data selection instruction was executed and the operation performed was Select A, then the instruction is re-executed and datum B is selected.

In a further embodiment, the instruction is re-executed, but no information is given on how it is to proceed in the re-execution. It simply re-executes as previously described, using, for instance, a low confidence execution path, i.e., based on accessing the condition to avoid further mis-executions based on misprediction of the condition. At this point the condition is available, having been used to check correctness of the prediction (e.g., in accordance with a checking step, such as STEP 512 of FIG. 5).

The generated internal operations are then placed on the issue queue to be executed, STEP 634, and processing continues to STEP 600.

Figure 7:
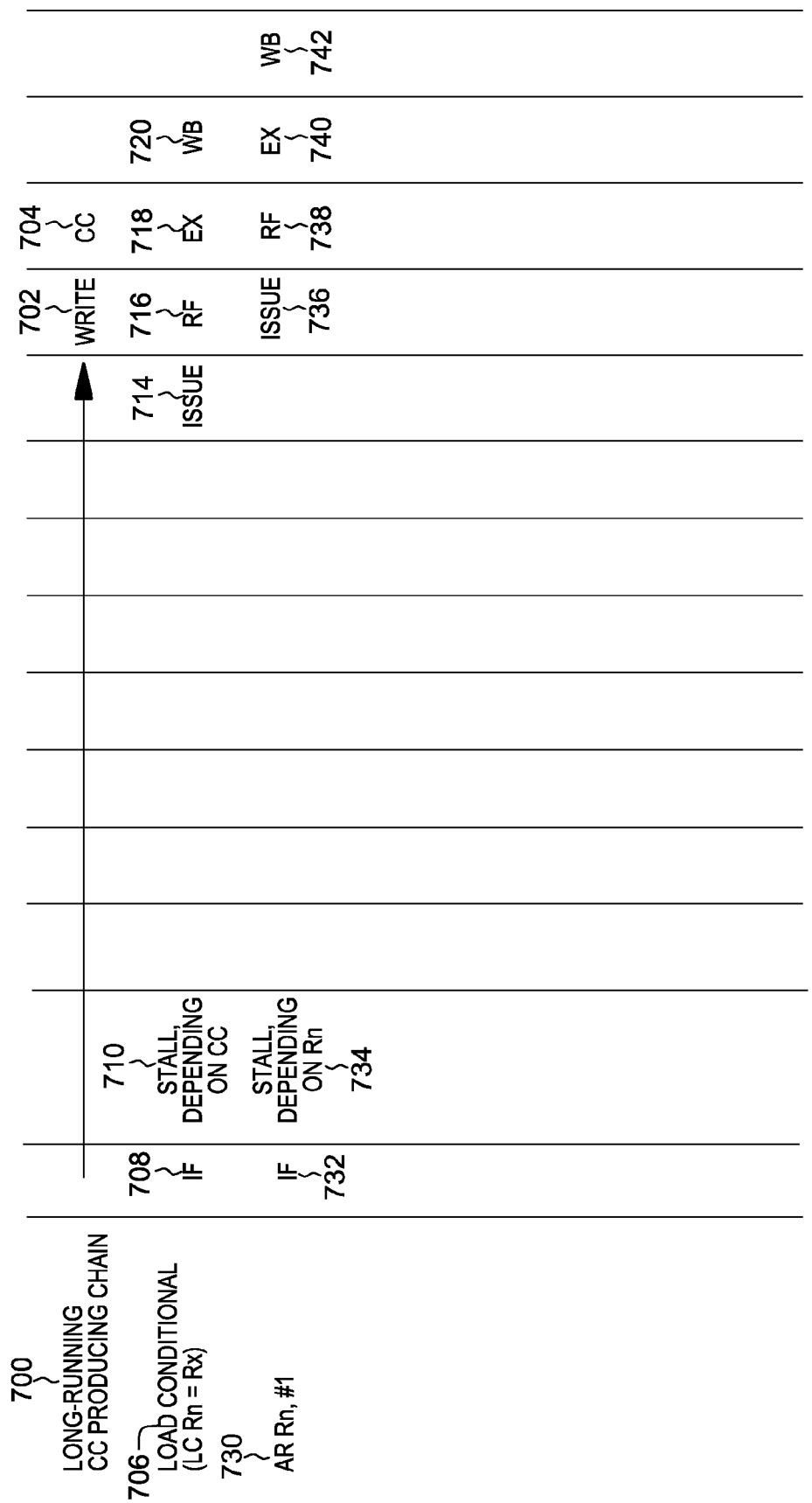
FIG. 7 depicts one example of a pipe diagram for a Load On Condition instruction executed in accordance with the prior art.
Figure 8A:
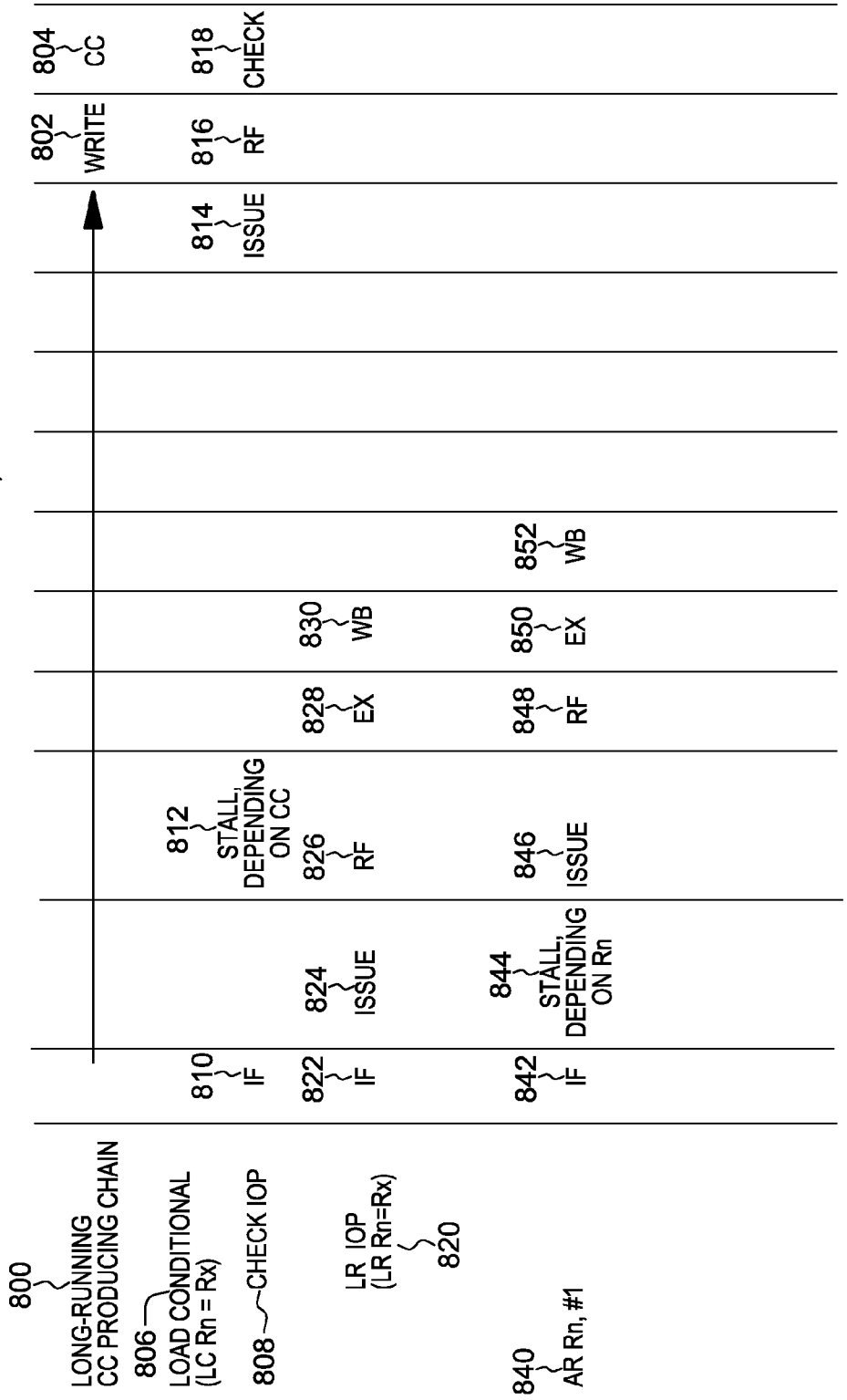
FIGS. 8A-8H depict examples of various pipe diagrams for execution of condition-based instructions in accordance with one or more aspects.
Figure 8B:
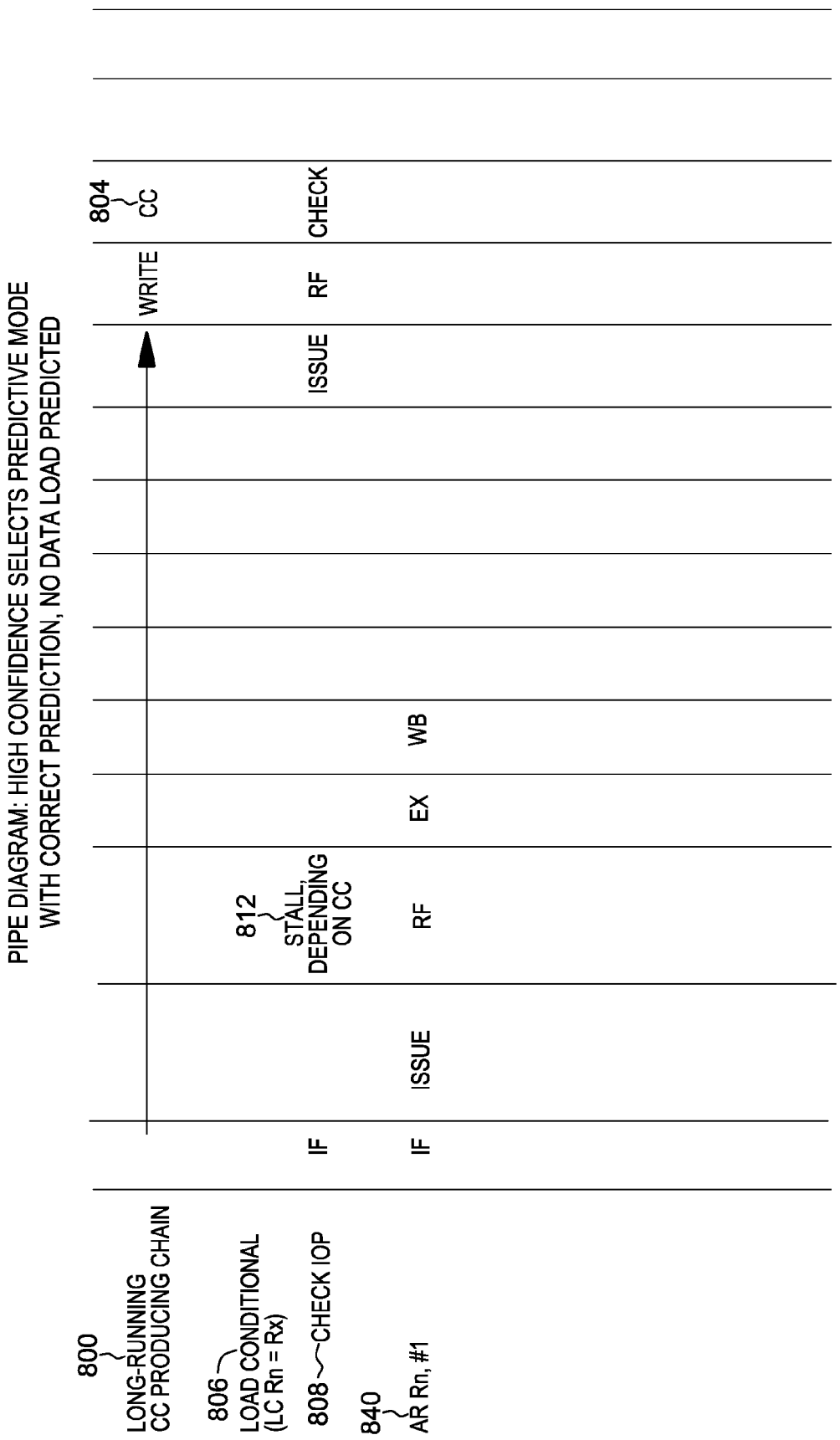
Figure 8C:
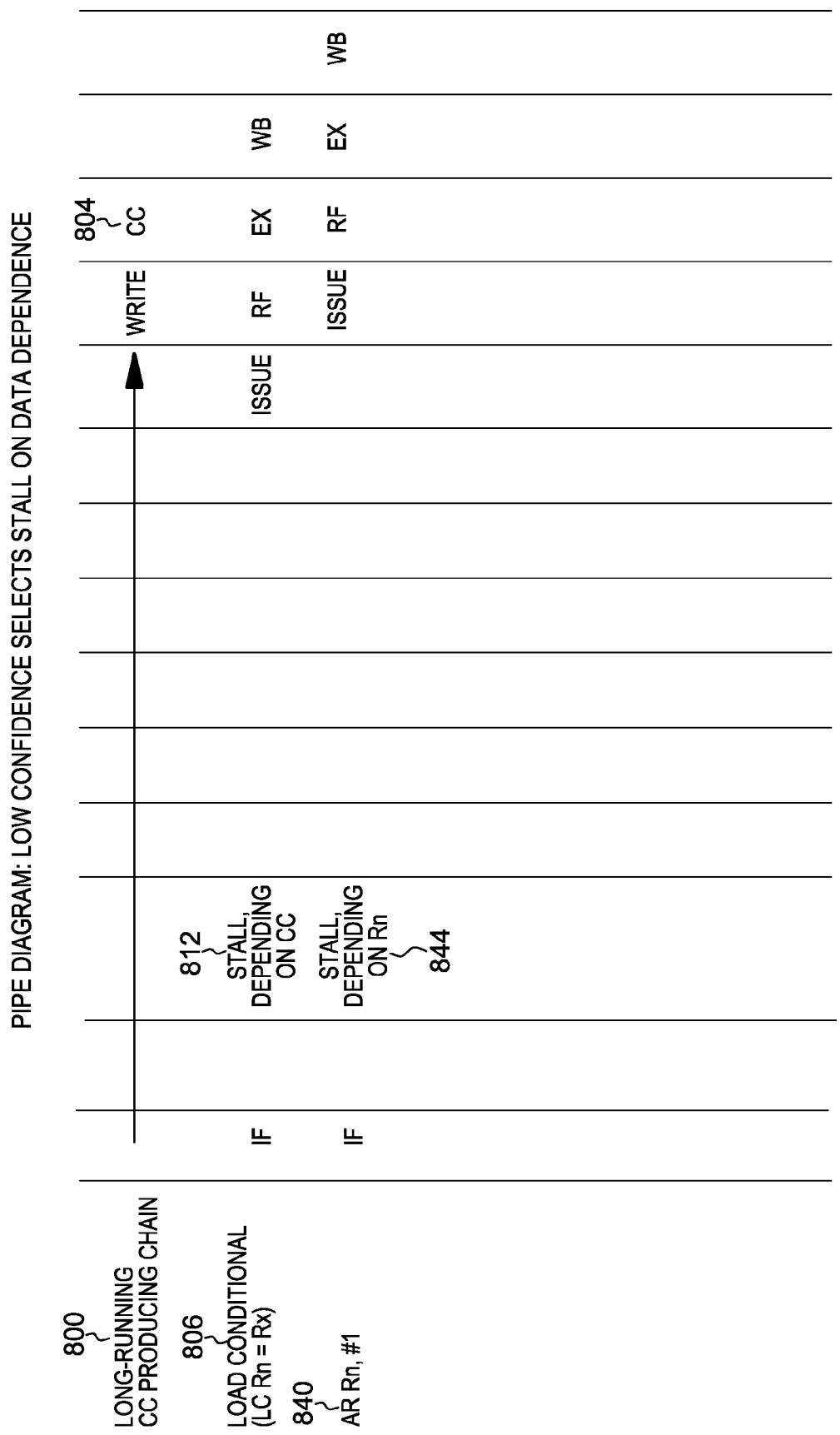
Figure 8D:
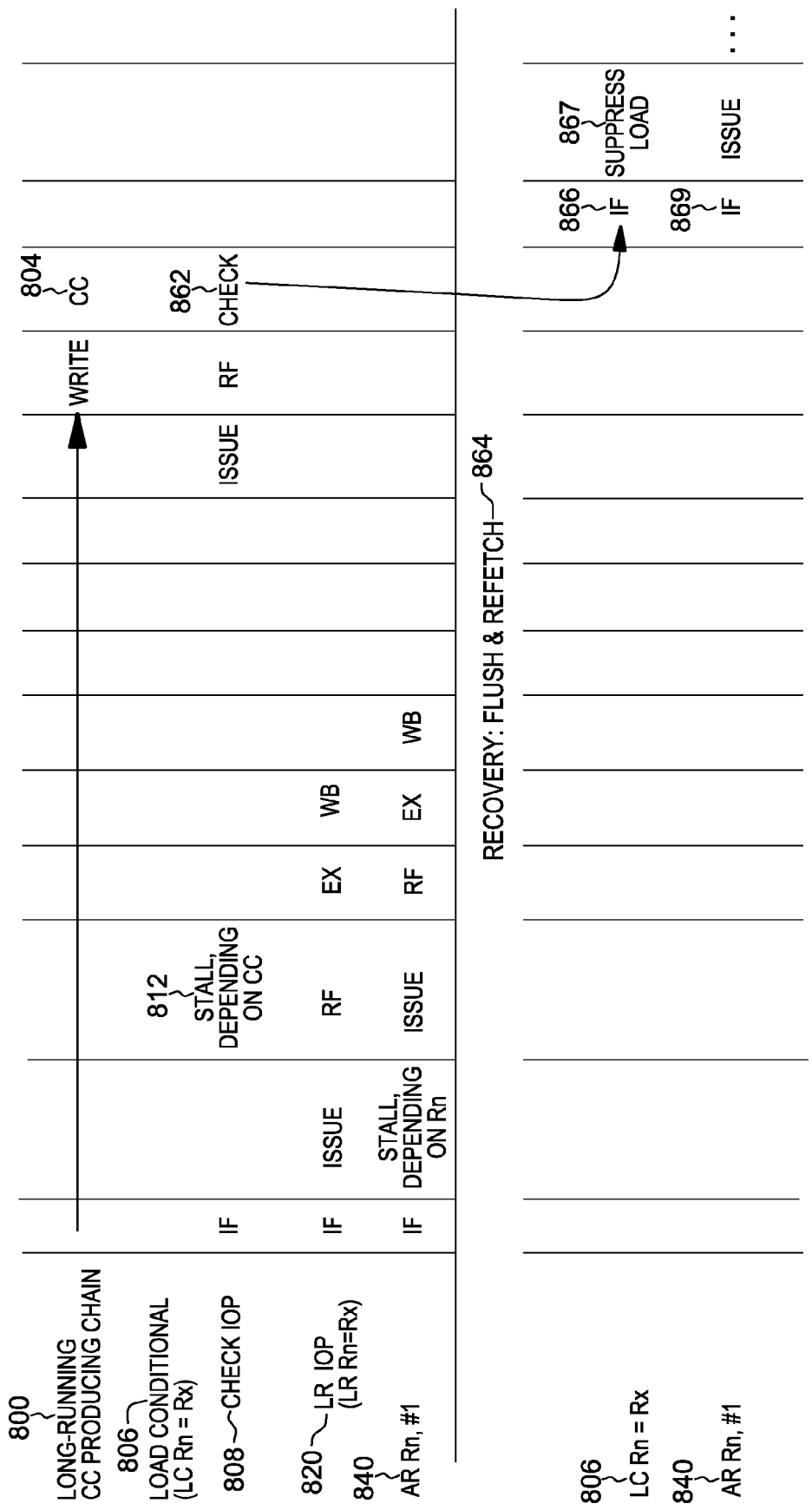
Figure 8E:
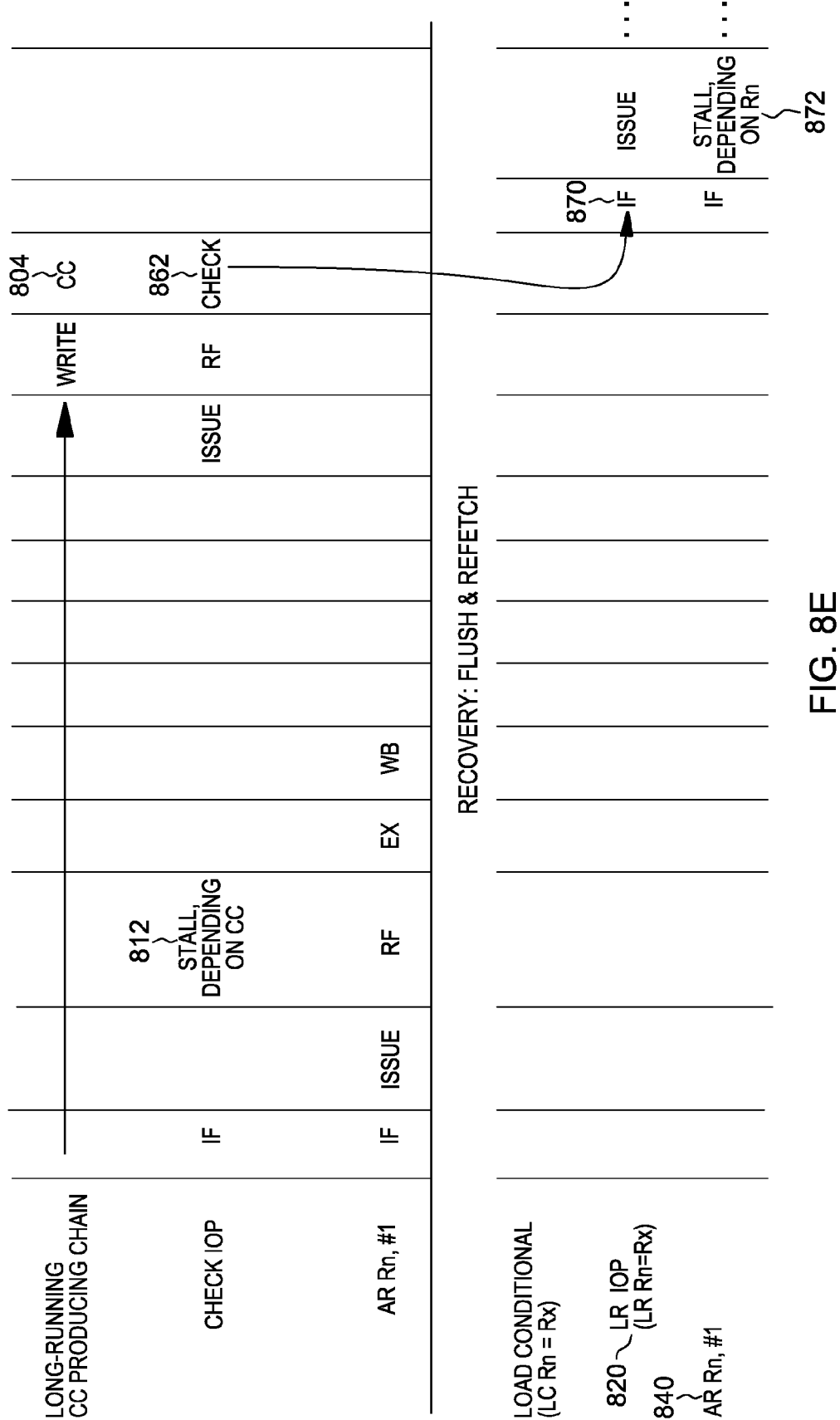
Figure 8F:
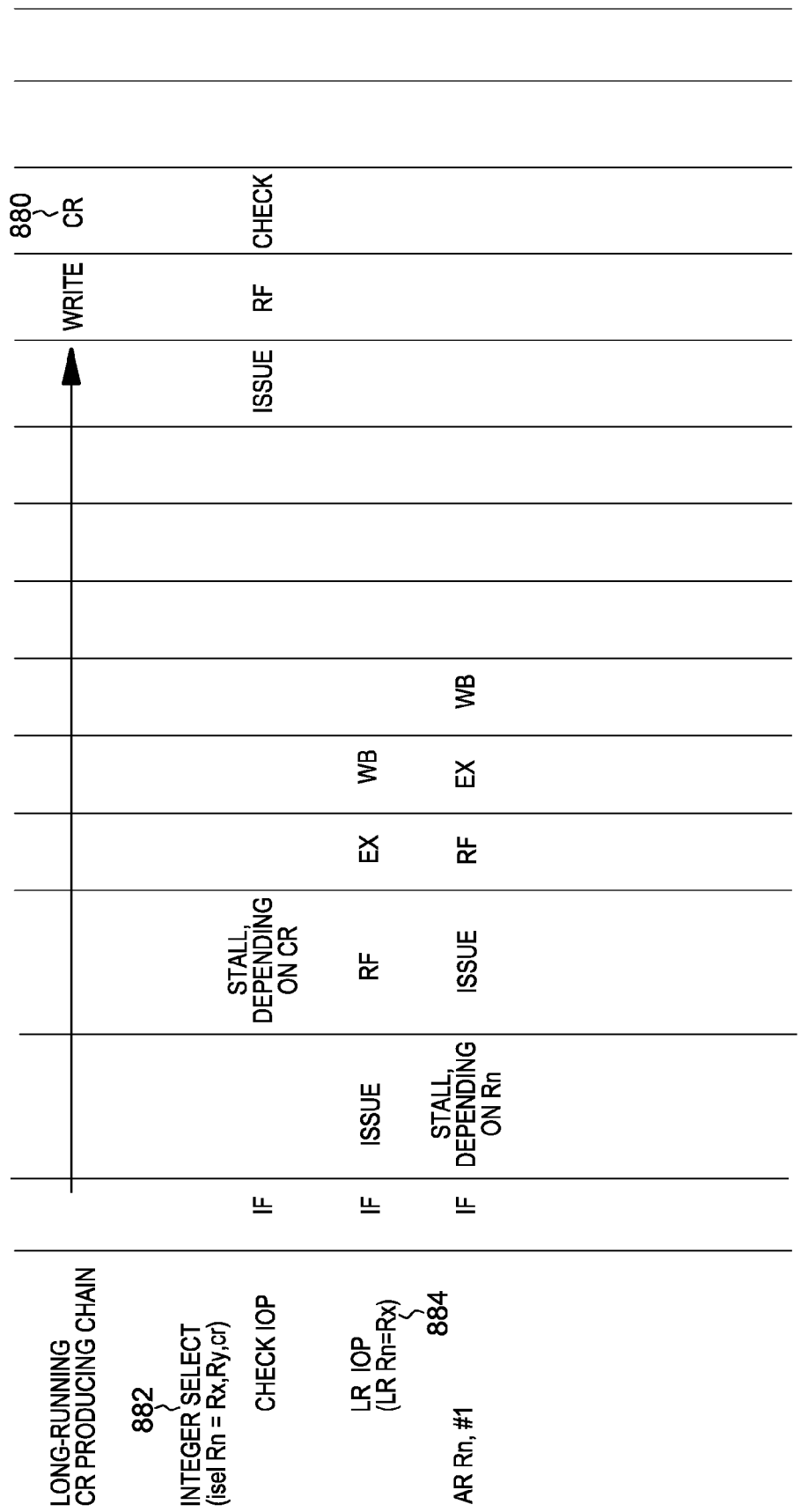
Figure 8G:
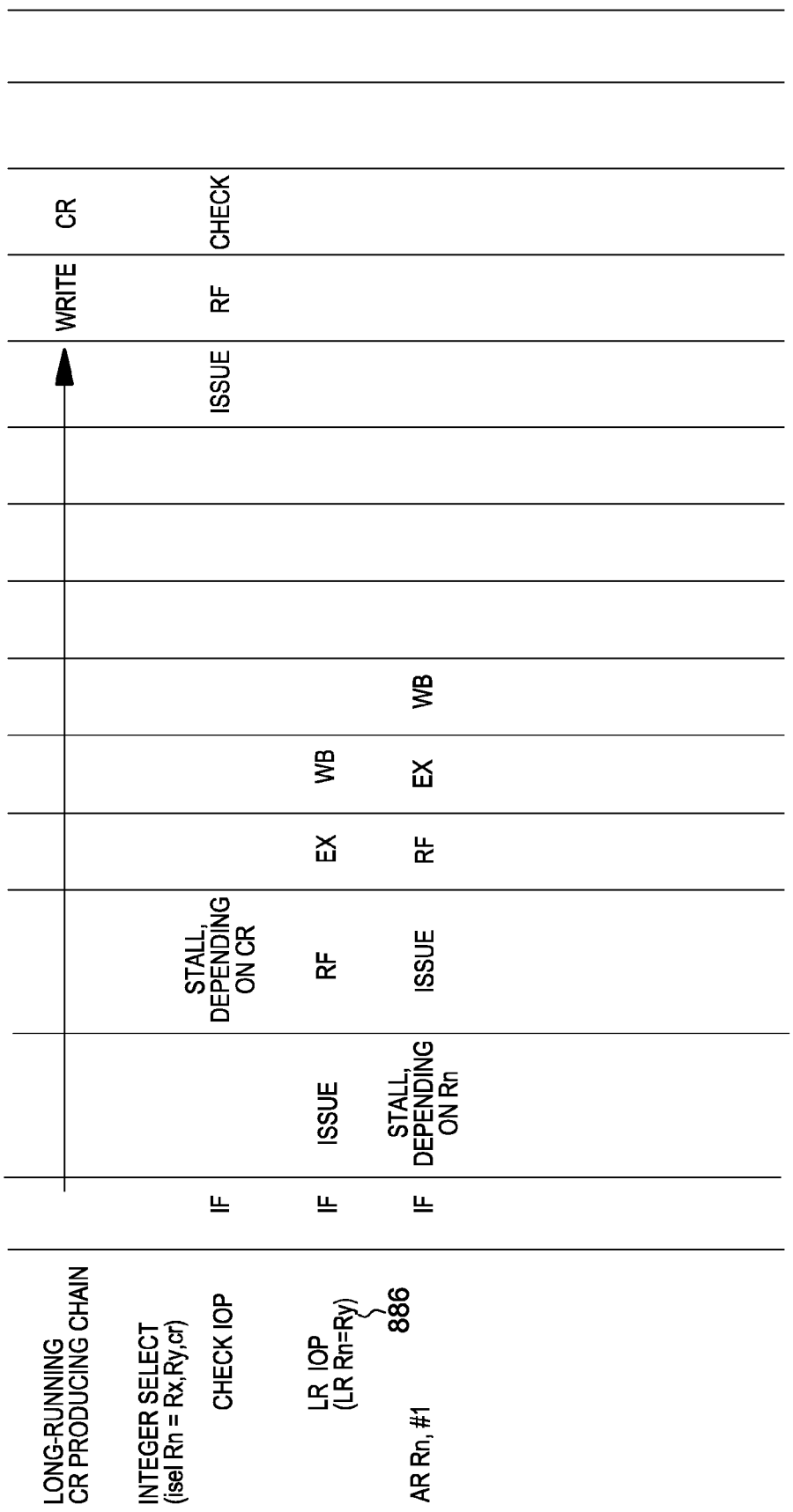
Figure 8H:
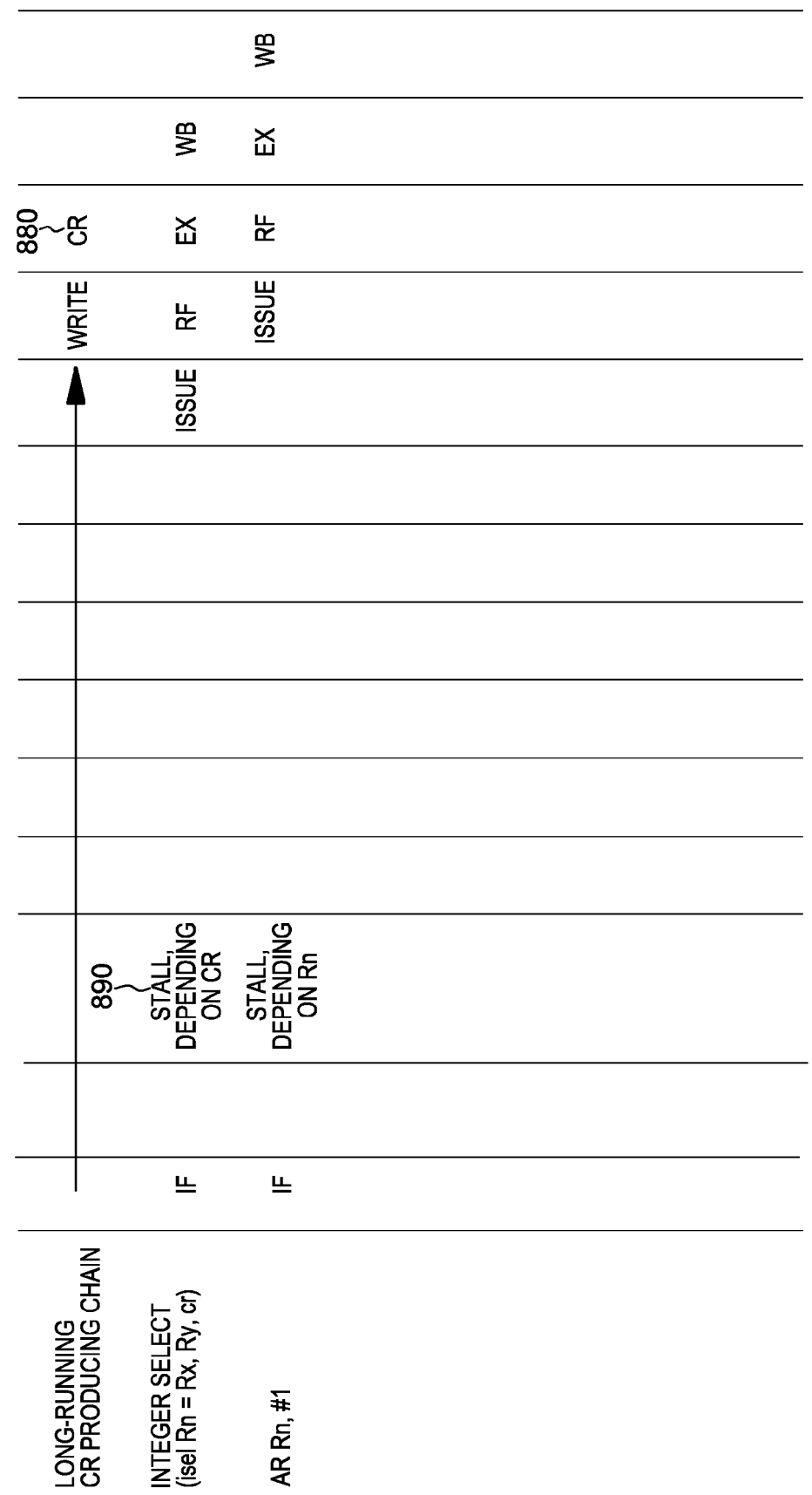

The effects of prediction and misprediction are further understood with reference to the example pipe diagrams depicted in FIGS. 7-8H. In each of these figures, the vertical lines depict example cycle boundaries and time passes from left to right. FIG. 7 is one example of a pipe diagram in which prediction is not used. As depicted, a long-running condition code (cc) producing chain 700 is executing and at time 702 a condition code 704 is written. In the meantime, a load conditional instruction (LC Rn=Rx) 706 is fetched 708 (IF—Instruction Fetch). However, processing of the instruction within the instruction pipeline is stalled 710 until condition code 704 is available. After the condition code is written, then the remaining stages of the instruction pipeline, including, for instance, issue 714, register file access (RF) 716, execution (EX) 718, and write back (WB) 720 are executed.

Similarly, processing of instruction AR 730 is affected, since AR 730 is dependent on execution of LC 706 which provides the Rn to be used by AR 730. Therefore, as shown, AR 730 is fetched 732; however, processing is stalled 734 waiting for Rn. After Rn is available, then processing of AR continues, including, for instance, issue 736, register file access 738, execution 740 and write back 742.

The pipe diagram of FIG. 7 is compared to the pipe diagrams of FIGS. 8A-8H. Each of these diagrams, including FIG. 7, shows a number of example processing stages. In other examples, other stages may be used or stages may be in a differing order. Many possibilities exist.

Referring initially to FIG. 8A, a pipe diagram is depicted showing a high confidence level that selected predictive mode with a correct prediction, in which a data load was predicted. In FIG. 8A, a long-running cc producing chain 800 is processing, and at time 802, a condition code 804 is written. Further, a Load Conditional (LC Rn=Rx) instruction 806 is initiated. In this example, since prediction is used, the LC instruction is replaced (during decode, which may be a part of fetch or issue, as examples) with a check IOP 808 and an unconditional LR 820 to reflect the prediction that the load is to be performed unconditionally, but speculatively. Thus, a check internal operation 808, which is to check if the prediction was accurate, is generated (e.g., using instruction fetch (IF) 810 and decode logic and corresponding to, e.g., STEP 506 of FIG. 5). This instruction stalls 812 depending on condition code 804. Further, a load register internal operation (LR Rn=Rx) 820 is generated (e.g., using instruction fetch 822 and decode logic and corresponding to, e.g., STEP 504). Since prediction is used, it need not stall, but instead, processing continues with, for instance, instruction issue 824, register file access 826, execution 828, and write back 830. Similarly, instruction 840 is fetched 842. This instruction stalls 844 depending on the value of Rn; however, unlike in FIG. 7, Rn should be available much sooner. Processing then continues with, for instance, issue 846, register file access 848, execute 850 and write back 852. Additionally, optimization is performed and one or more of stages 846-852 are initiated prior to receiving Rn.

Returning to stall 812, after the condition code is available, processing continues with, for instance, issue 814, register file access 816, and execute in which a check 818 of the prediction is performed.

FIG. 8B depicts another example of a pipe diagram, but this diagram shows a high confidence that selects a predictive mode with correct prediction and no data load is predicted. Therefore, the value of Rn is readily available for AR 840. Check IOP 808 still stalls 812 waiting for condition code 804, since prediction was used.

In FIG. 8C, one example of a pipe diagram is depicted that has a low confidence, and therefore, it selects stall on data dependence as shown at 812. For instance, a load conditional (LC) internal operation 806 is generated (e.g., using instruction fetch and decode) and stalls 812 waiting for condition code 804. Similarly AR 840 also stalls 844 waiting for Rn.

FIG. 8D depicts one example in which there is recovery due to an incorrect prediction. In particular, FIG. 8D depicts one example of a pipe diagram in which the high confidence selects predictive mode, in which data load is predicted, but the prediction is incorrect. In this scenario, a check operation 862 that is performed during execution, when condition code 804 is available, indicates a misprediction. Therefore, the check operation causes a recovery to be performed, including a flush and refetch 864. In the recovery, LC 806 is refetched 866 and processed using the available condition (e.g., previously used by check). However, in this example, the load is suppressed 867, since the prediction of load was incorrect. Further, AR 840 is also refetched 869 and processed (e.g., issue, register file access, execute, write back).

Similarly FIG. 8E depicts one example of a pipe diagram in which high confidence selects predictive mode in which no data load is predicted, but the prediction is incorrect. In this scenario, a load is to be performed, since the prediction of no load was incorrect. Thus, an internal instruction 820 is generated (e.g., using instruction fetch 870 and decode), and processed (e.g., issue, register file access, execute and write back). Further, instruction AR 840 stalls 872 depending on Rn.

FIG. 8F is one example of a pipe diagram for a data selection instruction in which there is high confidence that selects a predictive mode with a correct prediction of an S1 data load. This is similar to FIG. 8A, but instead of a condition code, there is a condition register 880, and instead of a load conditional instruction, there is an integer select instruction 882. The processing is similar, but instead of a load, a data selection of a first operand 884 is performed.

Similarly, FIG. 8G depicts one example of a pipe diagram in which there is high confidence and predictive mode is selected with a correct prediction of an S2 data load. Thus, in this example, the second operand 886 is selected.

FIG. 8H depicts one example of a pipe diagram for an ISEL instruction in which there is low confidence, and therefore, there is a stall 890 on data dependents (e.g., control register 880).

Described in detail above is one example of using predictors to facilitate execution of condition-based instructions. A predictor is obtained for a condition-based instruction to be executed, and a confidence level of the predictor is checked. If the confidence level is high, then the condition-based instruction is executed based on the prediction and without waiting for the actual condition to be determined. This allows the condition-based instruction and instructions that are dependent on the condition-based instruction to be executed faster than if waited for the condition to actually be determined. If the confidence level of the predictor is low, then the condition-based instruction stalls waiting for the actual condition to be determined.

In one example, the predictor is obtained from a predictor table; however, in another embodiment, the predictor is encoded within the instruction (e.g., one or more bits of the instruction). This enables a programmer or other to provide guidance as to whether prediction is to be used. Further, in another embodiment, prior to proceeding with the prediction, a determination is made as to whether an up-to-date condition code (or other condition) is available. If so, then the actual value of the condition is used rather than the predicted condition. As examples, the condition may be provided as a condition code or in a register, such as a condition register, a general purpose register, a floating point register, etc. The condition is input to the instruction being executed based on the predictive functionality.

In one example, there are multiple predictors: a first predictor (confidence level) provides selection of one execution path of a plurality of execution paths for an instruction. The plurality of execution paths include a predictive path, in which execution proceeds based on a prediction of a second predictor (prediction).

In one embodiment, the predictor logic or circuitry may be included in branch circuitry or branch prediction circuitry to facilitate provision of the prediction functionality.

Further details regarding prediction are provided in U.S. Pat. No. 6,513,109, entitled "Method and Apparatus for Implementing Execution Predicates in a Computer Processing System," Gschwind et al., issued Jan. 28, 2003, which is hereby incorporated by reference in its entirety.

Herein, one or more of the following terms, including memory, main memory, storage and main storage, are used interchangeably, unless otherwise noted explicitly or by context.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 9:
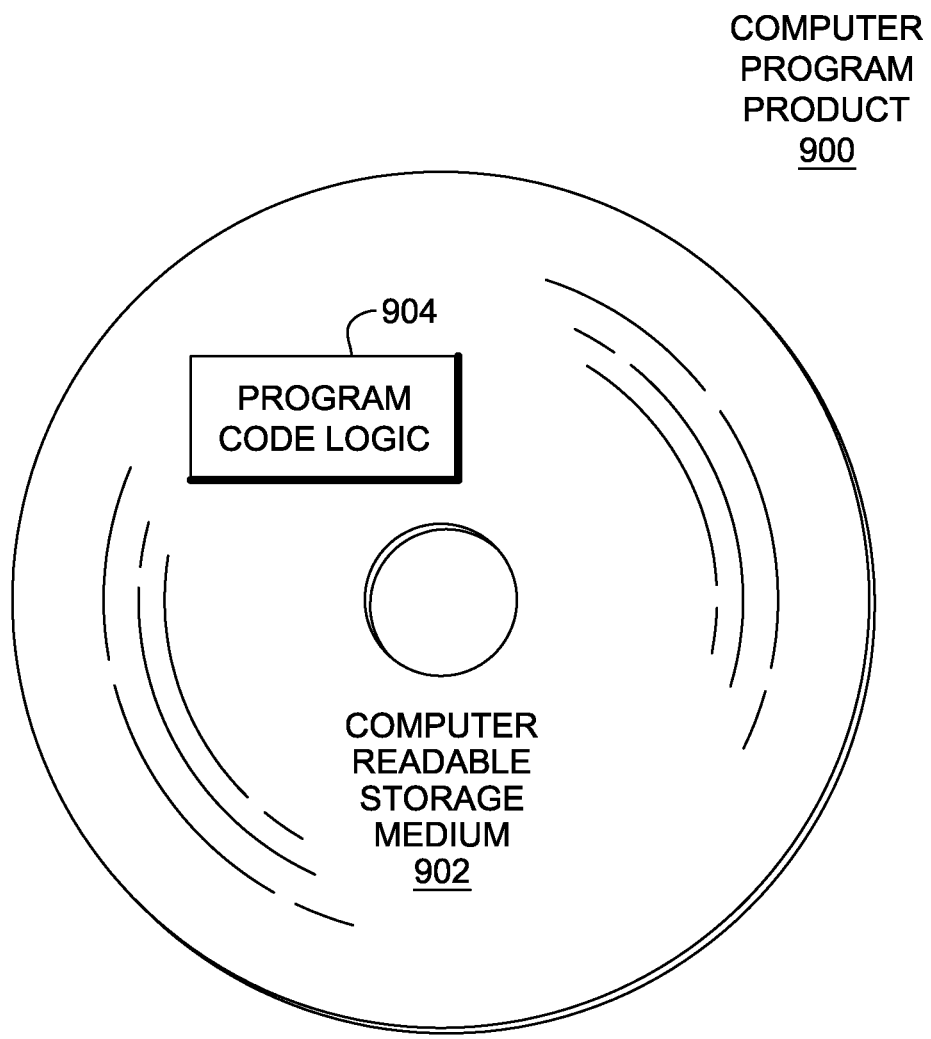
FIG. 9 depicts one embodiment of a computer program product incorporating one or more aspects.

Referring now to FIG. 9, in one example, a computer program product 900 includes, for instance, one or more non-transitory computer readable storage media 902 to store computer readable program code means or logic 904 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for aspects may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, computing environments of other architectures can incorporate and use one or more aspects. Further, other types of predictors may be used and/or other types of instructions may use predictors without departing from one or more aspects. Further, there may be more, less and/or different processing stages, and/or there may be other ways to implement the instructions. Other variations are also possible.

Further, other types of computing environments can benefit from one or more aspects. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 10:
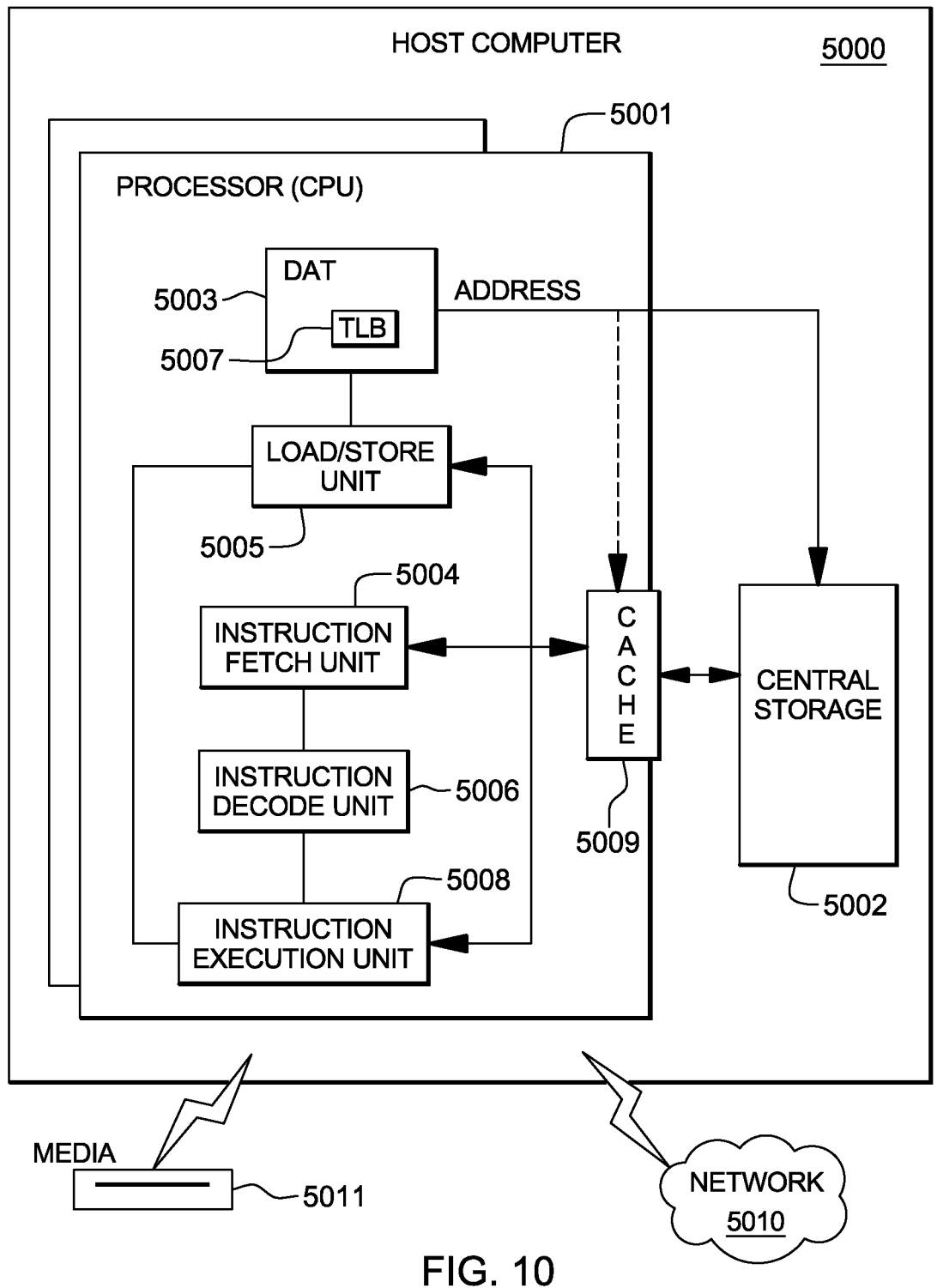
FIG. 10 depicts one embodiment of a host computer system.

Referring to FIG. 10, representative components of a Host Computer system 5000 to implement one or more aspects are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects). Referring to FIG. 10, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 11:
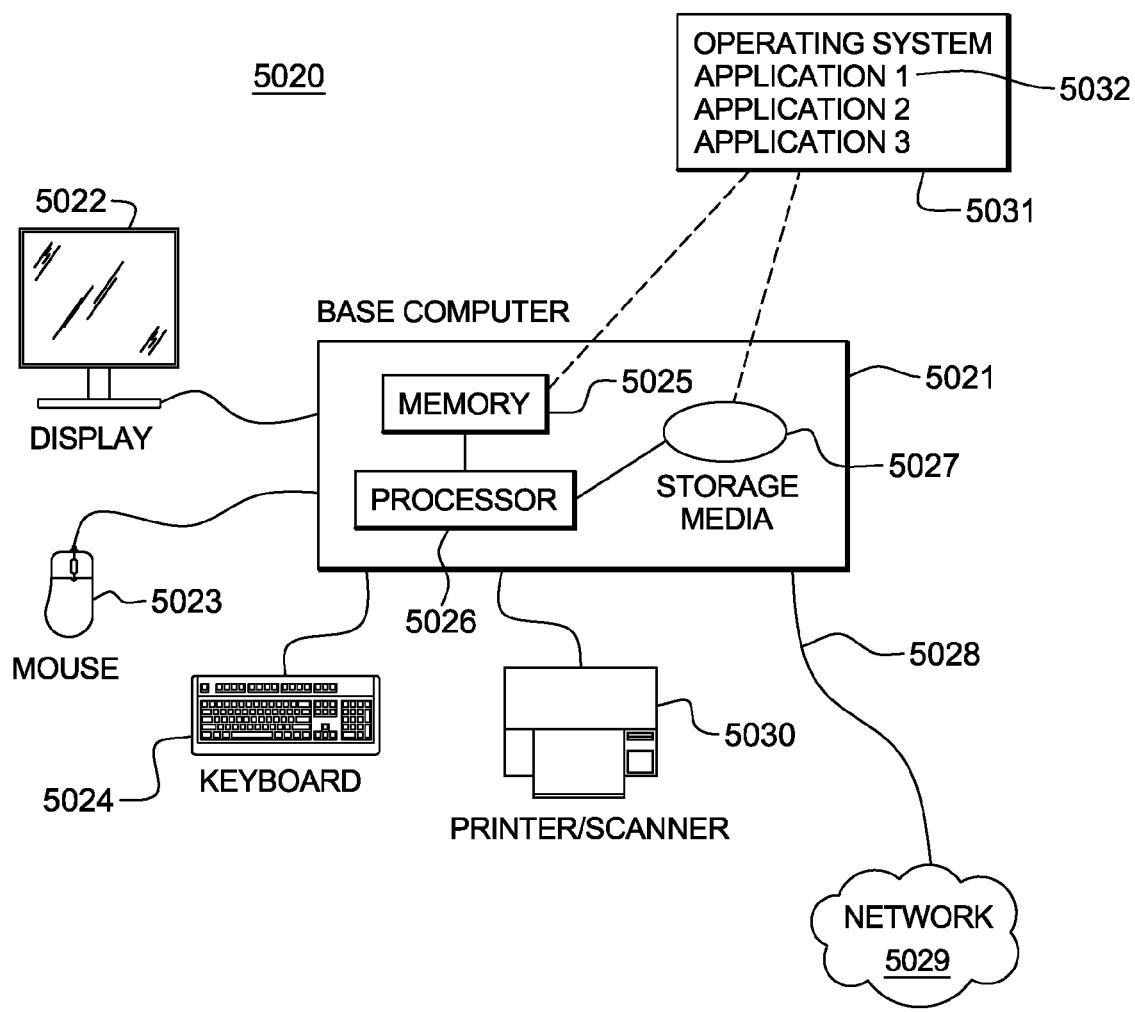
FIG. 11 depicts a further example of a computer system.

FIG. 11 illustrates a representative workstation or server hardware system in which one or more aspects may be practiced. The system 5020 of FIG. 11 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 12:
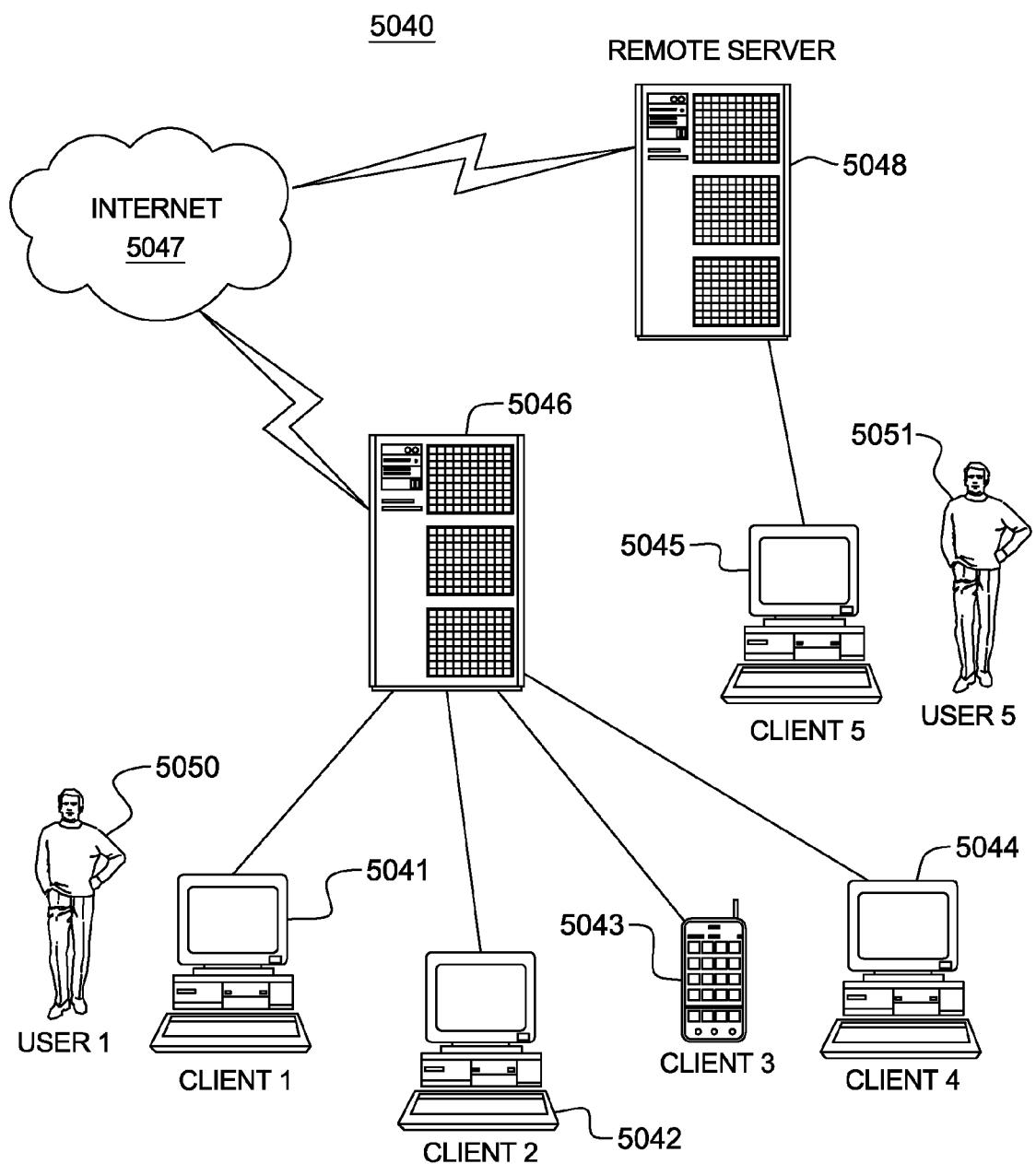
FIG. 12 depicts another example of a computer system comprising a computer network.

FIG. 12 illustrates a data processing network 5040 in which one or more aspects may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 12, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z server available from International Business Machines Corporation.

Referring concurrently to FIG. 11 and FIG. 12, software programming code which may embody one or more aspects of the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 13:
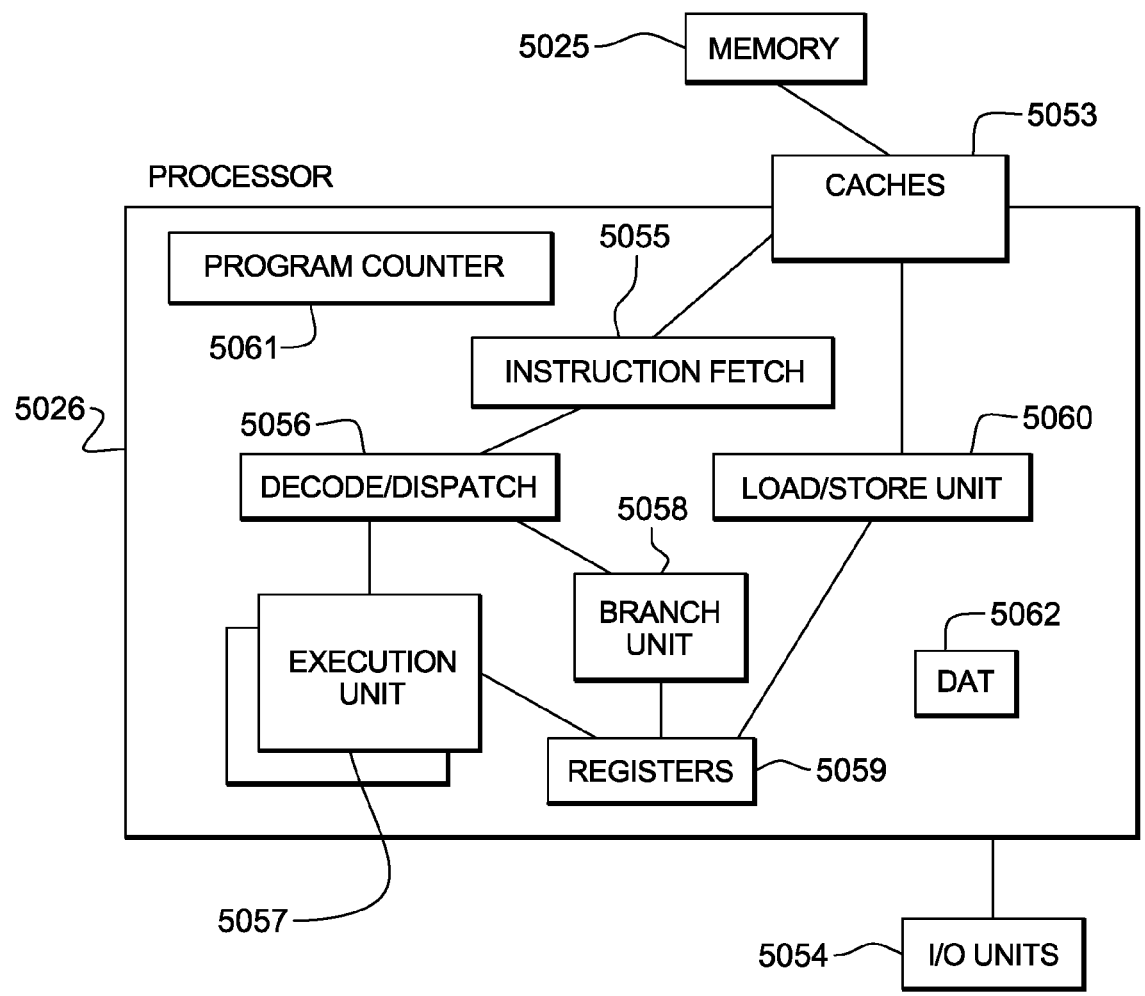
FIG. 13 depicts one embodiment of various elements of a computer system.

Referring to FIG. 13, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 14A:
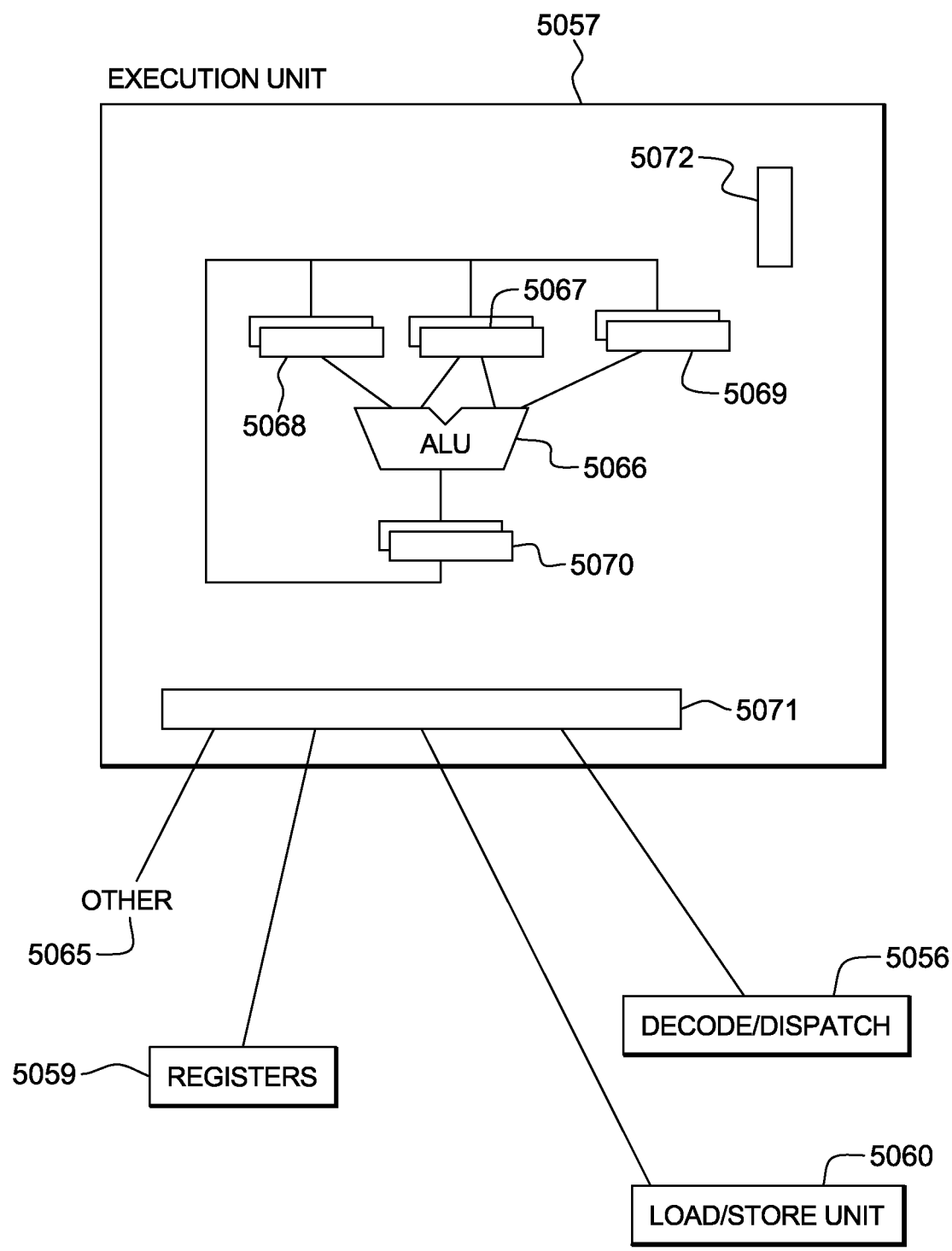
FIG. 14A depicts one embodiment of the execution unit of the computer system of FIG. 13.

A processor 5026 typically has one or more units 5057, 5058, 5060 for executing the function of the instruction. Referring to FIG. 14A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 14B:
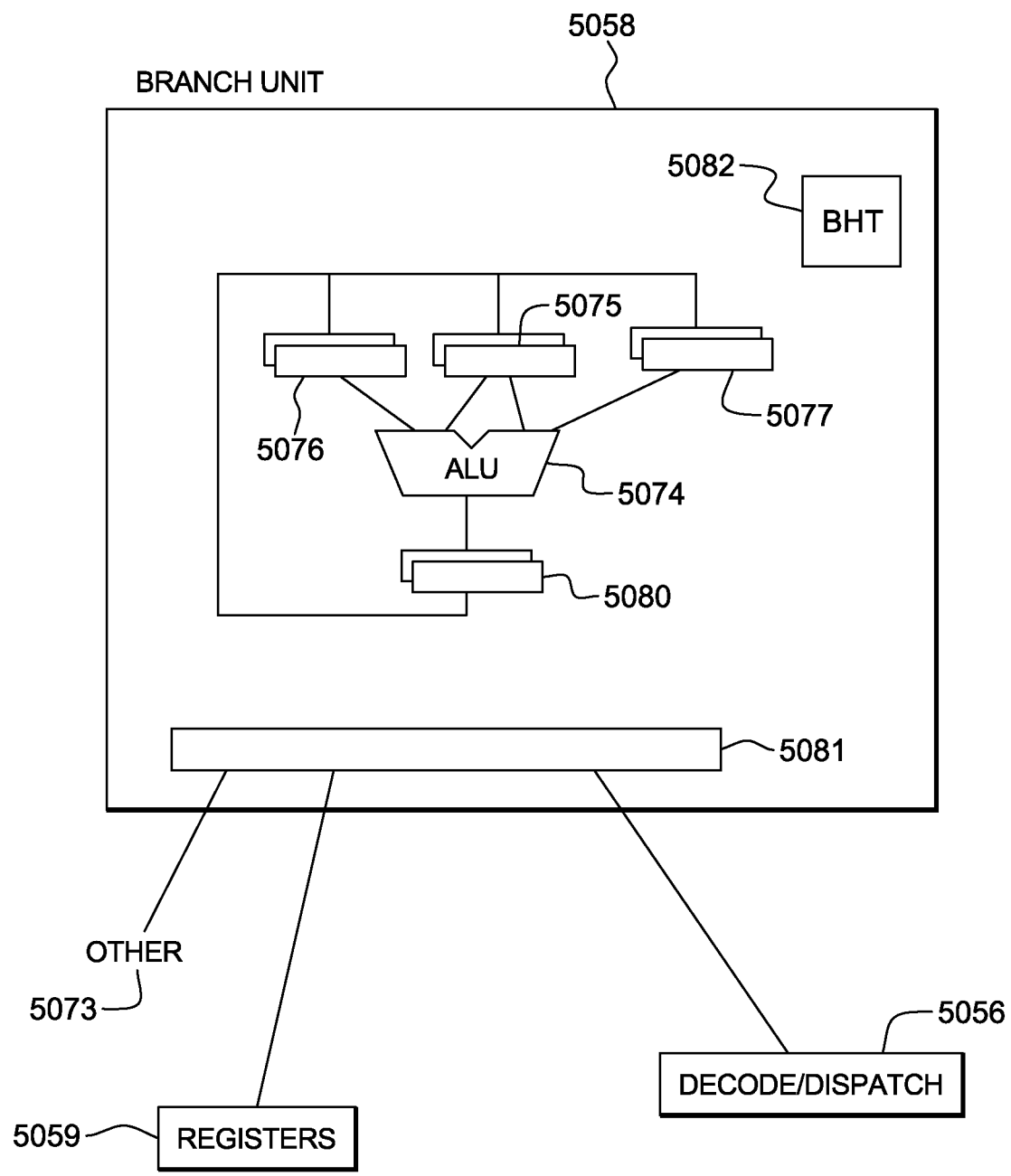
FIG. 14B depicts one embodiment of the branch unit of the computer system of FIG. 13.

Referring to FIG. 14B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 14C:
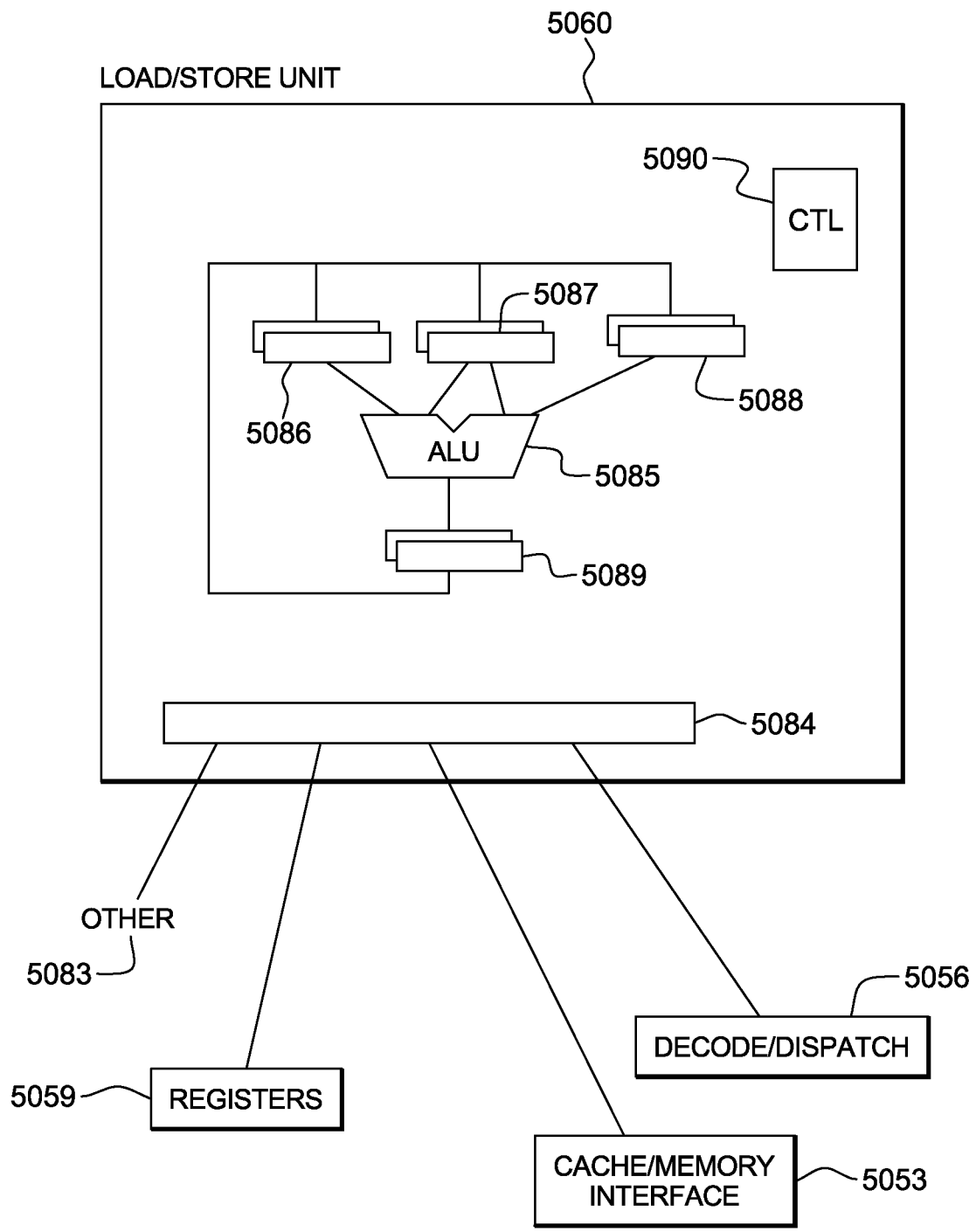
FIG. 14C depicts one embodiment of the load/store unit of the computer system of FIG. 13.

Referring to FIG. 14C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 13) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of one or more embodiments. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 15:
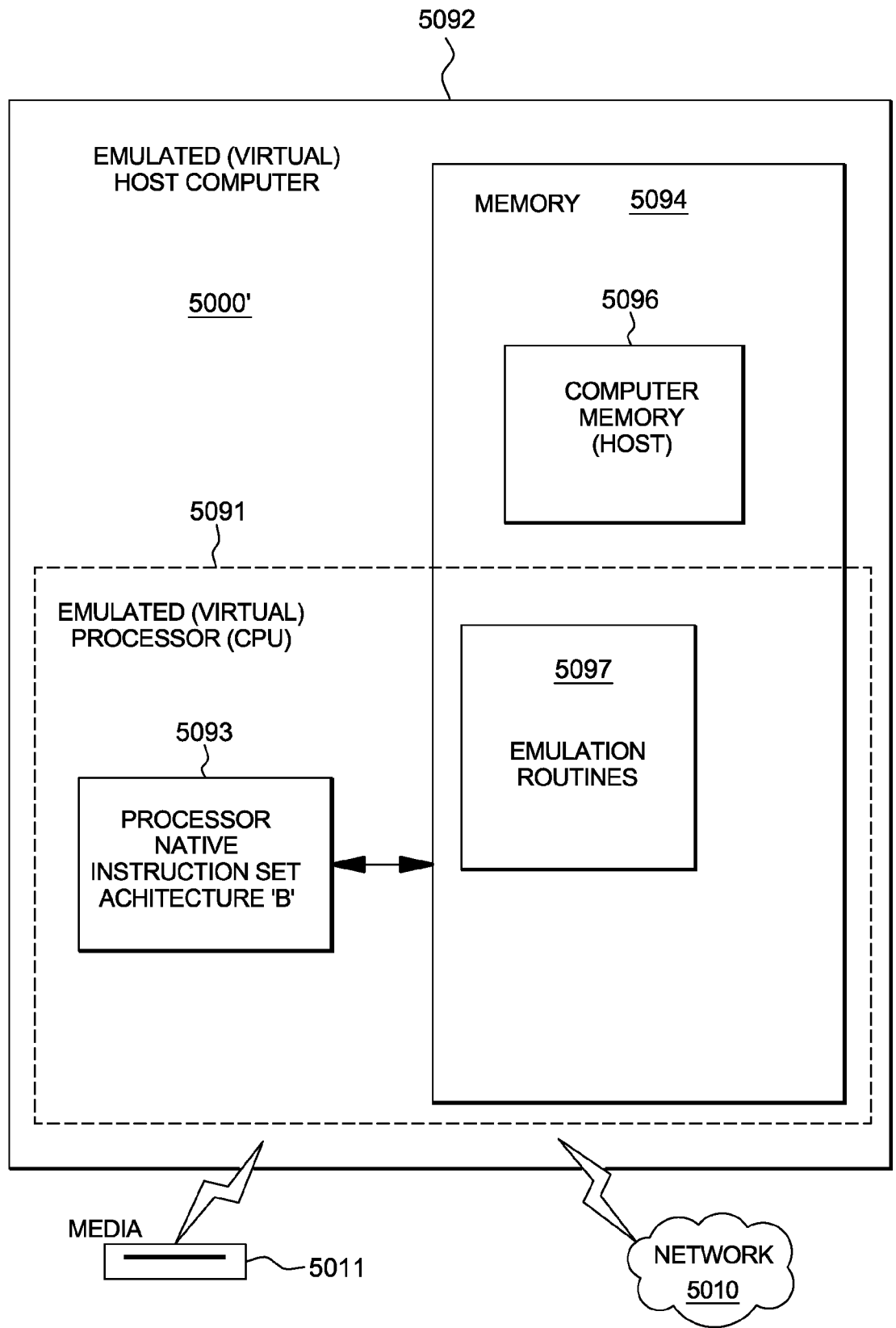
FIG. 15 depicts one embodiment of an emulated host computer system.

In FIG. 15, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects has been presented for purposes of illustration and description, but is not intended to be exhaustive or limited to the invention in the form disclosed. Many modifications and variations will be apparent to those of ordinary skill in the art without departing from the scope and spirit of one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

What is claimed is:

1. A computer program product for facilitating execution of a load on condition instruction in a computing environment, said computer program product comprising:

a non-transitory computer readable storage medium readable by a processing circuit and storing instructions for execution by the processing circuit for performing a method comprising:

associating a confidence level with the load on condition instruction; and executing the load on condition instruction, the executing comprising:

checking the confidence level associated with the load on condition instruction;

based on the confidence level being a first value, unconditionally performing a predicted operation of the load on condition instruction, the predicted operation based on a predictor associated with the load on condition instruction, wherein the unconditionally performing comprises generating one or more internal operations to perform the predicted operation and at least one internal operation to check accuracy of predicting the predicted operation, the one or more internal operations to perform the predicted operation including one or more internal operations to perform a load operation or to suppress a load operation depending on the predicted operation of the load on condition instruction, the one or more internal operations being unconditionally performed and absent stalling for a condition code to indicate whether the load operation or a suppression of the load operation is to be performed, and the at least one internal operation to check accuracy being stalled waiting for the condition code indicating whether the load operation or the suppression of the load operation is to be performed; and based on the confidence level being a second value, conditionally performing a specified operation of the load on condition instruction, the specified operation based on a determined condition, and wherein the conditionally performing comprises generating one or more conditional internal operations to be executed.

2. The computer program product of claim 1, wherein the confidence level is one of:

a part of the predictor; or another predictor separate from the predictor.

3. The computer program product of claim 1, wherein the specified operation comprises one of the load operation or the suppression of a load operation.

4. The computer program product of claim 1, wherein the determined condition is an input to the load on condition instruction, and the specified operation is the load operation or the suppression of a load operation.

5. The computer program product of claim 1, wherein the method further comprises:

based on unconditionally performing the predicted operation, checking the accuracy of predicating the predicted operation; and continuing processing associated with the load on condition instruction based on the checking.

6. The computer program product of claim 5, wherein the continuing processing comprises one of:

completing the load on condition instruction based on the checking indicating an accurate prediction; and performing recovery based on the checking indicating an inaccurate prediction.

7. The computer program product of claim 1, further comprising updating a prediction data structure, the prediction data structure to include one or more of the confidence level and the predictor.

8. The computer program product of claim 1, wherein based on the confidence level being the second value, obtaining the determined condition, wherein the obtaining comprises obtaining the determined condition from one of a condition code or a register.

9. A computer system for facilitating execution of a load on condition instruction in a computing environment, the computer system comprising:
a memory; and
a processor in communications with the memory, wherein the computer system is configured to perform:
associating a confidence level with the load on condition instruction; and
executing the load on condition instruction, the executing comprising:
checking the confidence level associated with the load on condition instruction;
based on the confidence level being a first value, unconditionally performing a predicted operation of the load on condition instruction, the predicted operation based on a predictor associated with the load on condition instruction, wherein the unconditionally performing comprises generating one or more internal operations to perform the predicted operation and at least one internal operation to check accuracy of predicting the predicted operation, the one or more internal operations to perform the predicted operation including one or more internal operations to perform a load operation or to suppress a load operation depending on the predicted operation of the load on condition instruction, the one or more internal operations being unconditionally performed and absent stalling for a condition code to indicate whether the load operation or a suppression of the load operation is to be performed, and the at least one internal operation to check accuracy being stalled waiting for the condition code indicating whether the load operation or the suppression of the load operation is to be performed; and
based on the confidence level being a second value, conditionally performing a specified operation of the load on condition instruction, the specified operation based on a determined condition, and wherein the conditionally performing comprises generating one or more conditional internal operations to be executed.

10. The computer system of claim 9, wherein the confidence level is one of:
a part of the predictor; or
another predictor separate from the predictor.

11. The computer system of claim 9, wherein the determined condition is an input to the load on condition instruction, and the specified operation is the load operation or the suppression of a load operation.

12. The computer system of claim 9, further comprising:
based on unconditionally performing the predicted operation, checking the accuracy of predicating the predicted operation; and
continuing processing associated with the load on condition instruction based on the checking.

13. The computer system of claim 12, wherein the continuing processing comprises one of:
completing the load on condition instruction based on the checking indicating an accurate prediction; and
performing recovery based on the checking indicating an inaccurate prediction.

14. The computer system of claim 9, further comprising updating a prediction data structure, the prediction data structure to include one or more of the confidence level and the predictor.

15. The computer program product of claim 1, wherein the load on condition instruction includes a mask field to provide one or more condition codes, and wherein the predicted operation comprises the load operation to be performed based on a selected indicator of the mask field, selected by a current condition code, being set to a selected value.

16. The computer system of claim 9, wherein the load on condition instruction includes a mask field to provide one or more condition codes, and wherein the predicted operation comprises the load operation to be performed based on a selected indicator of the mask field, selected by a current condition code, being set to a selected value.

17. A method of facilitating execution of a load on condition instruction in a computing environment, the method comprising:
associating a confidence level with the load on condition instruction; and
executing the load on condition instruction, the executing comprising:
checking the confidence level associated with the load on condition instruction;
based on the confidence level being a first value, unconditionally performing a predicted operation of the load on condition instruction, the predicted operation based on a predictor associated with the load on condition instruction, wherein the unconditionally performing comprises generating one or more internal operations to perform the predicted operation and at least one internal operation to check accuracy of predicting the predicted operation, the one or more internal operations to perform the predicted operation including one or more internal operations to perform a load operation or to suppress a load operation depending on the predicted operation of the load on condition instruction, the one or more internal operations being unconditionally performed and absent stalling for a condition code to indicate whether the load operation or a suppression of the load operation is to be performed, and the at least one internal operation to check accuracy being stalled waiting for the condition code indicating whether the load operation or the suppression of the load operation is to be performed; and
based on the confidence level being a second value, conditionally performing a specified operation of the load on condition instruction, the specified operation based on a determined condition, and wherein the conditionally performing comprises generating one or more conditional internal operations to be executed.

18. The method of claim 17, wherein the confidence level is one of:
a part of the predictor; or
another predictor separate from the predictor.

19. The method of claim 17, wherein the determined condition is an input to the load on condition instruction, and the specified operation is the load operation or the suppression of a load operation.

20. The method of claim 17, further comprising:
based on unconditionally performing the predicted operation, checking the accuracy of predicating the predicted operation; and continuing processing associated with the load on condition instruction based on the checking.

\* \* \* \* \*